(12) United States Patent
Park et al.

(10) Patent No.: US 8,347,161 B2
(45) Date of Patent: Jan. 1, 2013

(54) MIMO SYSTEM PERFORMING HYBRID ARQ AND RETRANSMISSION METHOD THEREOF

(75) Inventors: In-Sook Park, Daejeon (KR); Jae-Young Ahn, Daejeon (KR)

(73) Assignee: Electronics And Telecommunications Research Institute, Daejeon (KR)

( * ) Notice: Subject to any disclaimer, the term of this patent is extended or adjusted under 35 U.S.C. 154(b) by 1227 days.

(21) Appl. No.: 12/067,874

(22) PCT Filed: Sep. 25, 2006

(86) PCT No.: PCT/KR2006/003803
§ 371 (c)(1), (2), (4) Date: Mar. 24, 2008

(87) PCT Pub. No.: WO2007/035067
PCT Pub. Date: Mar. 29, 2007

(65) Prior Publication Data
US 2008/0256410 A1    Oct. 16, 2008

(30) Foreign Application Priority Data

Sep. 23, 2005 (KR) .................. 10-2005-0088959
Jun. 16, 2006 (KR) .................. 10-2006-0054266

(51) Int. Cl.
*G06F 11/00* (2006.01)
(52) U.S. Cl. ...................................................... 714/748
(58) Field of Classification Search .................. 714/748
See application file for complete search history.

(56) References Cited

U.S. PATENT DOCUMENTS

| | | | |
|---|---|---|---|
| 2004/0057530 A1 | 3/2004 | Tarokh et al. | |
| 2004/0255203 A1* | 12/2004 | Miyoshi | 714/48 |
| 2005/0002478 A1* | 1/2005 | Agami et al. | 375/345 |
| 2006/0107167 A1* | 5/2006 | Jeong et al. | 714/748 |
| 2006/0270427 A1* | 11/2006 | Shida et al. | 455/512 |
| 2007/0061690 A1* | 3/2007 | Stewart et al. | 714/800 |

FOREIGN PATENT DOCUMENTS

| | | |
|---|---|---|
| EP | 1 294 120 | 3/2003 |
| KR | 10-2003-0039316 | 5/2003 |

(Continued)

OTHER PUBLICATIONS

International Search Report for PCT/KR2006/003803 dated Apr. 17, 2007.

(Continued)

*Primary Examiner* — Scott Baderman
*Assistant Examiner* — Jigar Patel
(74) *Attorney, Agent, or Firm* — Kile Park Goekjian Reed & McManus PLLC

(57) ABSTRACT

The present invention relates to a multiple antenna transmitting/receiving apparatus that performs a hybrid automatic repeat request, and a retransmission method thereof. An initial transmission signal is encoded into the form of an initial transmission matrix and transmitted to the receiving apparatus, the initial transmission matrix corresponding to a linear dispersion code, with a result of error checking performed on the initial transmission signal by the receiving apparatus. When an error is detected in the initial transmission signal, a first retransmission signal is generated by encoding the initial transmission signal in the form of a retransmission matrix and transmitted to the receiving apparatus. The retransmission matrix is formed of constituent elements of the initial transmission matrix but different from the initial transmission matrix, and corresponds to a linear dispersion code having the same capacity and diversity gain as those of the initial transmission matrix.

29 Claims, 7 Drawing Sheets

FOREIGN PATENT DOCUMENTS

| KR | 10-2006-0055269 | 5/2006 |
|---|---|---|
| KR | 10-2006-0074014 | 6/2006 |

OTHER PUBLICATIONS

Written Opinion for PCT/KR2006/003803 dated Apr. 17, 2007.

Babak Hassibi et al., "High Rate Codes That Are Linear in Space and Time", IEEE Transactions on Information Theory, vol. 48, No. 7, Jul. 2002, pp. 1804-1824.

Robert W. Heath, et al., "Linear Dispersion Codes for MIMO Systems Based on Frame Theory", IEEE Transaction on Signal Processing, vol. 50, No. 10, Oct. 2002, pp. 2429-2441.

Adrian Agustin, et al., "Hybrid Turbo FEC/ARQ Systems and Distributed Space-Time Coding for Cooperative Transmission in the Downlink", IEEE, International Symposium on Personal, Indoor and Mobile Radio Communications, 2004, pp. 380-384.

\* cited by examiner

MIMO SYSTEM PERFORMING HYBRID ARQ AND RETRANSMISSION METHOD THEREOF

BACKGROUND OF THE INVENTION (a) Field of the Invention

The present invention relates to a multiple input multiple output (MIMO) antenna transmitting/receiving apparatus that performs a hybrid automatic repeat request (ARQ), and a retransmission method thereof.

(b) Description of the Related Art

A MIMO transmitting/receiving system is more advanced than a single input single output (SISO) transmitting/receiving system that transmits a signal to a receiver through a single path, and exploits an effect of multipath propagation by transmitting a signal to a receiver through multiple paths.

The MIMO system uses a plurality of antennas in order to realize various transmit/receive paths in a hardware manner, and transmits a transmission signal to a receiver with different timing by applying a different time delay to the respective paths. Accordingly, the MIMO system has merits of increasing efficiency in use of resources compared to a conventional SISO system and improving transmitting/receiving performance by realizing transmitting/receiving in various manners.

A data transmission rate that measures transmitting/receiving performance is determined by parameters such as the amount of maximum mutual information (hereinafter, referred to as capacity), a diversity gain, and spectral efficiency.

In order to obtain a high data transmission rate, high spectral efficiency is required, and therefore design of a space time code achieving high capacity is needed. The linear dispersion code, one of the most well-known space time codes, is generated by simple encoding, as well as the data transmission rate can be relatively easily reflected in the design of a linear dispersion code since the linear dispersion code is flexible in diversity over space and time domains or over space and frequency domains. Compared to the Bell Laboratories layered space-time (BLAST) code, the linear dispersion code has a similar level of detection complexity but provides a higher coding gain than BLAST.

When a hybrid automatic repeat request (hereinafter, referred to as a hybrid ARQ) protocol is applied to the MIMO system, additional capacity for retransmission can be obtained through a space time code, particularly a space time block code due to the feature of transmitting a signal through a plurality of antennas.

U.S. Patent Publication No. 2004/0057530 A1 (entitled "Incremental Redundancy with Space-Time Codes" filed on Mar. 25, 2004) relates to data retransmission of a MIMO system using a conventional hybrid ARQ protocol.

However, the retransmission technique disclosed in this prior art does not involve the cases of transmitting data encoded in the form of a space time coded matrix. Herein, the space time coded matrix is formed by combining symbols that form the initial transmission data and, hereafter, a space time coded matrix to be transmitted is referred to as a transmission matrix. That is, the prior art does not suggest any solution on a retransmission method for a transmission scheme with both high capacity and diversity effect reducing errors due to fading, nor any method for combining received signals after retransmission.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a multiple antenna transmitting/receiving apparatus that performs a hybrid automatic repeat request (ARQ) generating a retransmission signal that has the same capacity and diversity gain as an initial transmission signal has, and a retransmission method thereof.

An exemplary retransmission method according to an embodiment of the present invention is provided to a multiple antenna transmitting apparatus that performs a hybrid automatic repeat request (ARQ) with a receiving apparatus. The retransmission method includes a step for encoding an initial transmission signal to be transmitted to the receiving apparatus into the form of an initial transmission matrix, transmitting the encoded initial transmission signal, and receiving a result of error checking performed on the initial transmission signal from the receiving apparatus. The initial transmission matrix corresponds to a linear dispersion code. When an error is detected in the initial transmission signal, the retransmission method includes a step for generating a first retransmission signal by encoding the initial signal and transmitting the encoded retransmission matrix to the receiving apparatus. The retransmission matrix is formed of constituent symbols of the initial transmission matrix but is different from the initial transmission matrix, and corresponds to a linear dispersion code having the same capacity and diversity gain as those of the initial transmission matrix.

An exemplary retransmission method according to another embodiment of the present invention is provided to a multiple antenna transmitting apparatus that performs a hybrid automatic repeat request (ARQ) with a receiving apparatus. The retransmission method includes a step for encoding a code word to be transmitted to the receiving apparatus in order to transmit the code word in the form of an initial transmission matrix and receiving a result of error checking performed on the code word from the receiving apparatus. The initial transmission matrix corresponds to a linear dispersion code. When an error is detected in the code word, the retransmission method adds a first parity to the codeword for error correction, and a first retransmission matrix is generated by encoding the codeword or a part of the codeword according to the form of a retransmission matrix and encoding the first parity into the form of the initial transmission matrix. The retransmission matrix is formed of the same constituent elements as the initial transmission matrix but is different from the initial transmission matrix, and corresponds to a linear dispersion matrix having the same capacity and diversity gain as that of the initial transmission matrix.

An exemplary retransmission method according to another embodiment of the present invention is provided to a multiple antenna transmitting apparatus that performs a hybrid automatic repeat request (ARQ) with a receiving apparatus. In the method, a codeword that includes an information word and an initial parity is encoded into an initial transmission matrix, the codeword is transmitted to the receiving apparatus, and a result of error checking is performed on the codeword from the receiving apparatus. Herein, the initial transmission matrix corresponds to a linear dispersion code. When an error is detected in the codeword, a first parity is added to the information word and a first retransmission signal is generated by encoding the information word into the form of a retransmission matrix and encoding the first parity into the form of the initial transmission matrix, and the first retransmission signal is transmitted to the receiving apparatus. Herein, the retransmission matrix is formed of constituent elements of the initial transmission matrix but is different from the initial transmission matrix and corresponds to a linear dispersion code having the same capacity and diversity gain as that of the initial transmission matrix.

An exemplary error detection method of a multiple antenna receiving apparatus according to an embodiment of the present invention is provided. The multiple antenna receiving apparatus performs a hybrid automatic repeat request (ARQ) with a transmitting apparatus. The error detection method includes checking errors in a retransmission signal retransmitted from the transmitting apparatus for an initial transmission signal. When an error is detected in the retransmission signal, a first log likelihood ratio (LLR) vector is generated by LLR soft-combining the initial transmission signal and the retransmission signal and converted to an information word, a channel variation range of the initial transmission signal and the retransmission signal is detected and compared with a predetermined reference value, and error checking is performed on the information word when the channel variation range exceeds the reference value.

An error checking method of a multiple antenna receiving apparatus that performs a hybrid automatic repeat request (ARQ) with a transmitting apparatus is provided. In the method, error checking is performed on a first retransmission signal that has been retransmitted from the transmitting apparatus for an initial transmission signal. When an error is detected in the first retransmission signal, a first LLR vector and a first parity are decoded and converted to an information word. Herein, the first LLR vector is generated by LLR soft-combining an initial transmission signal encoded in the form of a retransmission matrix and the initial transmission signal, and the first parity is included in the first retransmission signal for error correction.

A channel variation range of the initial transmission signal and the first retransmission signal is detected and compared with a predetermined reference value. When the channel variation range exceeds the reference value, error checking is performed on the information word. In this case, the first transmission signal is encoded into the form of the retransmission matrix formed of constituent elements of the initial transmission matrix encoded from the initial transmission signal but different from the initial transmission matrix and corresponding to a linear dispersion code that has the same capacity and diversity gain as that of the initial transmission matrix. The first parity encoded in the form of the initial transmission matrix is added to the first retransmission signal for error correction.

An error checking method of a multiple antenna receiving apparatus that performs a hybrid automatic repeat request (ARQ) with a retransmitting apparatus with a transmitting apparatus is provided. In the error checking method, error checking is performed on a first retransmission signal retransmitted from the transmitting apparatus for an initial transmission signal that includes an information word and an initial parity. When an error is detected therein, a first LLR vector is converted to an information word, wherein the first LLR vector is generated by LLR soft-combining the information word of the first retransmission signal and the information word of the initial transmission signal.

A channel variation of the initial transmission signal and the retransmission signal is detected and compared with a predetermined reference value. When the channel variation range exceeds the reference value, the information word, the initial parity, and a first parity are decoded and error-checked, wherein the first parity is included in the first retransmission signal from error correction. In this case, the first retransmission signal includes the information word and the first parity. The information word is encoded into the form of the first retransmission matrix that is formed of constituent elements of the initial transmission matrix but different from the initial transmission matrix and corresponds to a linear dispersion code having the same capacity and diversity gain as that of the initial transmission matrix. The first parity is encoded into the initial transmission matrix and then added to the information word for error correction.

A multiple antenna transmitting apparatus according to another embodiment of the present invention is provided to perform a hybrid automatic repeat request with a receiving apparatus. The multiple antenna transmitting apparatus includes a channel encoder and a space-time code (STC) encoder. The channel encoder encodes an information word for transmission and a first parity for error correction and generates a codeword. The STC encoder generates a retransmission signal by encoding the codeword to a linear dispersion code and transmits the retransmission signal to the receiving apparatus. The retransmission signal has the same capacity and diversity gain as that of an initial transmission signal. The retransmission signal corresponds to a first retransmission matrix formed of constituent elements of an initial transmission matrix than encodes the initial transmission signal but is different from the initial transmission matrix.

A multiple antenna receiving apparatus according to another exemplary embodiment of the present invention performs a hybrid automatic repeat request with a transmission apparatus. The multiple antenna receiving apparatus includes a log likelihood ratio (LLR) calculator, a channel decoder, and a cycle redundancy check (CRC) unit. The LLR calculator generates an LLR vector by using an initial transmission signal and a retransmission signal when an error is detected in the retransmission signal. The channel decoder converts the LLR vector generated by the LLR calculator to an information word. The CRC unit checks errors in the information word and transmits a result of the error checking to the receiving apparatus.

DETAILED DESCRIPTION OF THE EMBODIMENTS

Figure 1:
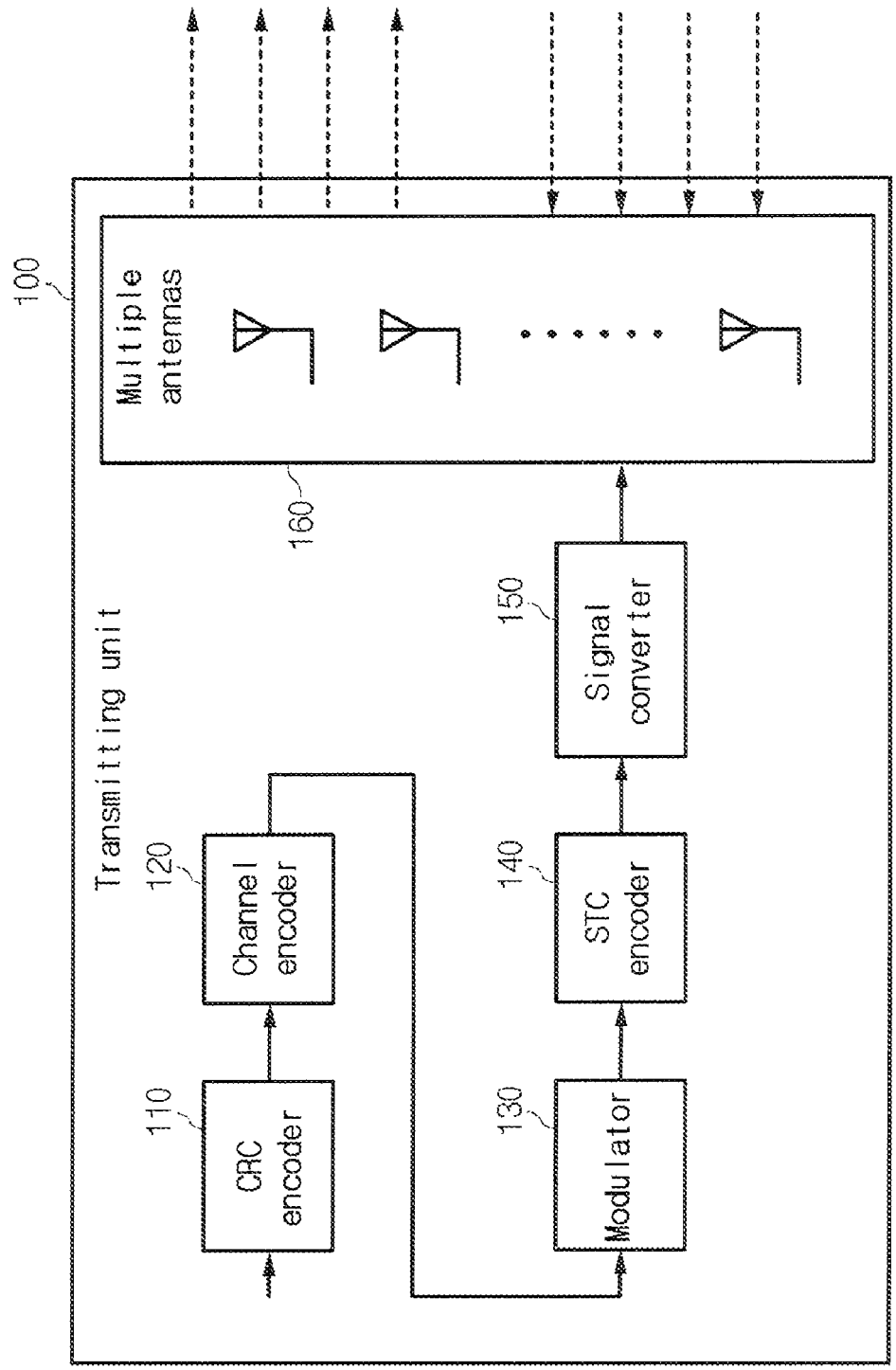
FIG. 1 shows a transmitting unit of a MIMO system that uses a hybrid ARQ protocol according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, throughout this specification and the claims which follow, unless explicitly described to the contrary, the word "comprise" and variations such as "comprises" or "comprising" will be understood to imply the inclusion of stated elements but not the exclusion of any other elements.

FIG. 1 is a block diagram of a transmitting unit of a multiple input multiple output (MIMO) system that uses a hybrid automatic repeat request (ARQ) scheme according to an exemplary embodiment of the present invention. The transmitting unit 100 includes a cyclic redundancy check (CRC) encoder 110, a channel encoder 120, a modulator 130, a space-time code (STC) encoder 140, a signal converter 150, and a multiple antenna unit 160.

The CRC encoder 110 adds a CRC parity to the data to be transmitted and this union of CRC parity and Data is called an information word. The channel encoder 120 receives the information word and encodes the information word to a codeword. The encoding process of the channel encoder 120 is attaching a parity to an input of the input channel encoder 120 for error correction according to a fixed code-rate. The modulator 130 phase-modulates the codeword from the channel encoder 120. The STC encoder 140 receives the signal modulated by the modulator 130 and encodes the signal with a space-time code so as to obtain high capacity and diversity gain. The signal converter 150 receives the signal encoded by the STC encoder 140 and converts the signal into an analog signal and amplifies it for propagation through the multiple antenna unit 160, and the multiple antenna unit 160 receives the converted signal and performs propagation.

Figure 2:
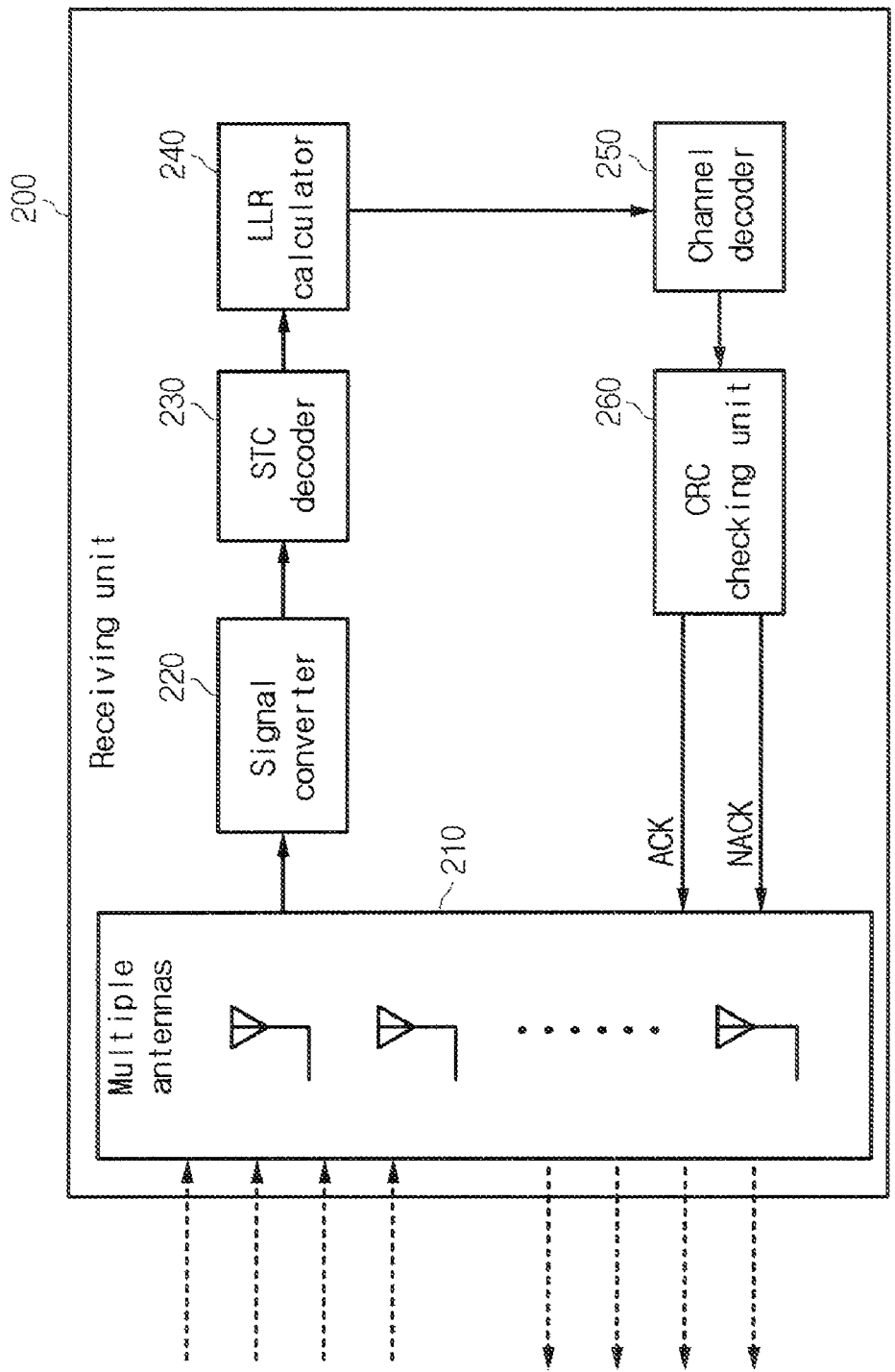
FIG. 2 is a block diagram of a receiving unit of the MIMO system that uses the hybrid ARQ protocol according to the exemplary embodiment of the present invention.

FIG. 2 is a block diagram of a receiving unit of the MIMO system that uses the hybrid ARQ scheme according to the exemplary embodiment of the present invention. The receiving unit 200 includes a multiple antenna unit 210, a signal converter 220, a STC decoder 230, an LLR (log likelihood ratio) calculator 240, a channel decoder 250, and a CRC checking unit 260.

The multiple antenna unit 210 receives the analog signal from the transmitting unit 100 of FIG. 1 and forwards the signal to the signal converter 220. The signal converter 220 converts the analog signal into a discontinuous signal (i.e. a received signal vector) and forwards the signal vectors to the STC decoder 230. The STC decoder 230 detects the signal vector transmitted from the transmitting unit 100 to the receiving unit 200 by using estimated fading coefficients, and forwards the detected signal to the LLR calculator 240. The LLR calculator 240 evaluates LLR values corresponding to the detected signal vectors, and the channel decoder 250 receives these LLR values and performs a decoding process on the LLR values to obtain an information word. The CRC checking unit 260 receives the information word from the channel decoder 250, performs CRC checking on the information word, and determines whether an error is detected therein. The CRC checking unit 260 transmits an ACK signal to the transmitting unit 100 through the multiple antenna unit 210 when no error is detected, and transmits a NACK signal to the transmitting unit 100 through the multiple antenna unit 210 when an error is detected.

When receiving the ACK signal, the transmitting unit 100 processes the next signal to be transmitted to the receiving unit 200 in the same manner as the previous signal is processed, and transmits the signal to the receiving unit 200. When the transmitting unit 100 receives the NACK signal from the receiving unit 200, the signal that has been initially transmitted is retransmitted.

The MIMO system using the hybrid ARQ scheme of FIG. 1 and FIG. 2 has three types of retransmission schemes. The type-I retransmission scheme uses the chase combining scheme, and the type-II and type-III of the retransmission schemes use incremental redundancy. The type-I retransmission scheme that uses the chase combining scheme will now be described.

When the number of transmit antennas is M and the size of a space-time encoding block is T, an initial transmission matrix S encoded from an initial transmission signal with a linear dispersion code is obtained by Math Figure 1.

$$S = \sum_{q=1}^{Q} (x_q C_q + x_q^* D_q) \qquad \text{[Math Figure 1]}$$

(where $C_q$ and $D_q$ denote M×T complex matrices, x* denotes a conjugate complex number of a complex number x, $x_q$ denotes a symbol, and q denotes a symbol index).

When an error is detected in the initial transmission signal transmitted from the transmitting unit 100, the receiving unit 200 transmits only a NACK signal to the transmitting unit 100, or transmits a signal indicating an error-detected portion in the information word of the initial transmission signal or transmits a signal indicating a specific portion where the level of error rate detected therein is higher than a reference level in the information word to the transmitting unit 100, as well as the NACK signal. When receiving the NACK signal from the receiving unit 200, the transmitting unit 100 encodes the initial transmission signals constituting the initial codeword by a retransmission matrix S̃ at the STC encoder 140 or encodes the initial transmission signals constituting a specific portion of the initial codeword by a retransmission matrix S̃ at the STC encoder 140.

In this case, when the number of transmit antennas and the space-time encoding block are respectively set to 2, a 2×2 initial transmission matrix S and a 2×2 retransmission matrix S̃ are obtained.

$$S = \begin{bmatrix} S_{11} & S_{12} \\ S_{21} & S_{22} \end{bmatrix}, \quad \tilde{S} = \begin{bmatrix} -S_{21}^* & -S_{22}^* \\ S_{11}^* & S_{12}^* \end{bmatrix} \qquad \text{[Math Figure 2]}$$

(where an element $S_{ij}$ of the matrix in row i of column j denotes linearly combined symbols $x_1$ to $x_Q$ and $x_1^*$ to $x_Q^*$, and i denotes an antenna number).

Figure 3:
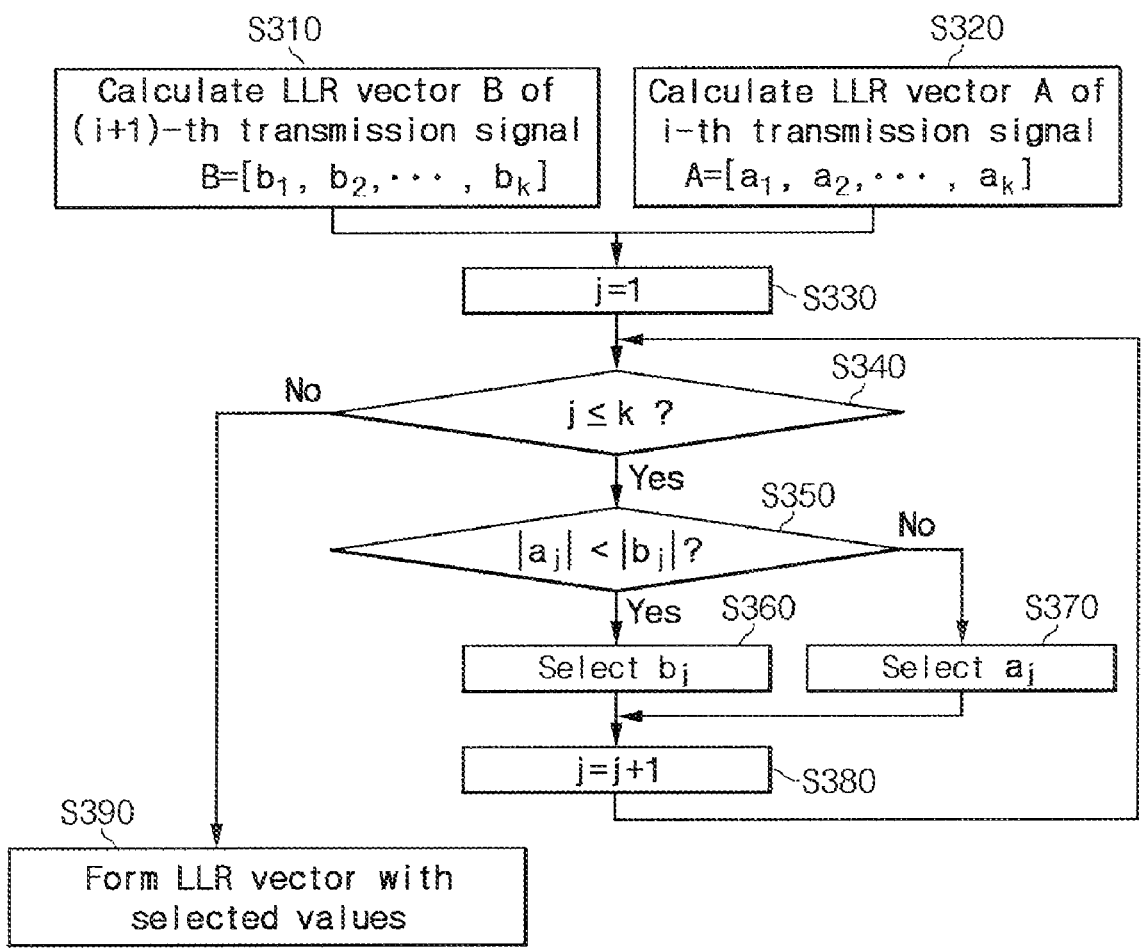
FIG. 3 is a flowchart for explaining a log-likelihood ratio (LLR) soft-combining scheme according to the exemplary embodiment of the present invention.

Math Figure 2 can be simplified into Math Figure 3.

$$\tilde{S} = \sum_{q=1}^{Q} \left( x_q \tilde{D}_q + x_q^* \tilde{C}_q \right), \qquad \text{[Math Figure 3]}$$

$$\tilde{D}_q = \begin{bmatrix} -D_{q21}^* & -D_{q22}^* \\ D_{q11}^* & D_{q12}^* \end{bmatrix}, \tilde{C}_q = \begin{bmatrix} -C_{q21}^* & -C_{q22}^* \\ C_{q11}^* & C_{q12}^* \end{bmatrix}$$

In this case, similar to the initial transmission matrix S, the retransmission matrix $\tilde{S}$ still corresponds to a linear dispersion code, and has the same capacity and diversity gain as those of the initial transmission matrix S.

The receiving unit 200 that has received the retransmission matrix $\tilde{S}$ from the transmitting unit 100 performs the following first to third processes.

In the first process, a signal transmitted in the form of the retransmission matrix $\tilde{S}$ is detected and error-corrected through the channel decoder 250. After the error correction, error checking is performed on the signal. When an error is detected at this time, the second and third processes are performed.

In the second process, an LLR vector is calculated by LLR soft-combining an LLR vector of the initial transmission matrix S and an LLR vector of the retransmission matrix $\tilde{S}$ by using the LLR calculator 240, and the calculated LLR vector is input to the channel decoder 250 for error correction and error checking.

In the third process, the STC decoder 230 obtains an LLR vector by performing soft-decision after performing STC combining and inputs the obtained LLR vector to the channel decoder 250, and the channel decoder 250 performs error correction and error checking on the input LLR vector. A signal to noise ratio (SNR) gain is obtained through the STC combining and thus absolute values of LLRs are increased such that a probability of error correction using a channel decoder is increased.

The second process provides more effective error correction when channel variation ranges of the initial transmission matrix S and the retransmission matrix $\tilde{S}$ are greater than a predetermined reference value, and the third process provides more effective error correction when the channel variation ranges of the initial transmission matrix S and the retransmission matrix $\tilde{S}$ are less than the predetermined reference value. Thus, the STC decoder 230 stores a reference value set by a manager of the receiving unit 200. When receiving the retransmission matrix $\tilde{S}$ from the transmitting unit 100, the receiving unit 200 checks an error by performing the first process, and then compares the channel variation range of the retransmission matrix $\tilde{S}$ and a predetermined reference value stored in the STC decoder 230.

As a result of the comparison, the receiving unit 200 performs only the second process when the channel variation range is greater than the predetermined reference value, and sequentially performs the second and third processes when the channel variation range is less than the predetermined reference value. Herein, the channel variation range refers to a fading difference of the initial transmission matrix $\tilde{S}$ and the retransmission matrix S, both transmitted from the transmitting unit 100 to the receiving unit 200 through a propagation medium.

The LLR soft-combining performed in the second process will now be described with reference to FIG. 3.

FIG. 3 is a flowchart for explaining LLR soft-combining according to the exemplary embodiment of the present invention. For convenience of description, when the i-th transmission signal is transmitted to the receiving unit 200 from the transmitting unit 100 in the form of an initial transmission matrix S, the (i+1)-th transmission signal is transmitted in the form of a retransmission matrix $\tilde{S}$, in one hybrid ARQ. In this case, the i-th transmission signal and the (i+1)-th transmission signal transmitted to the receiving unit 200 from the transmitting unit 100 may be partially repeated. The LLR soft-combining according to the exemplary embodiment of the present invention compares absolute values of LLRs of symbols that form the iterative parts of the i-th transmission signal and the (i+1)-th transmission signal in a unit of bit or symbol, and generates an LLR vector formed of LLRs, each having a larger absolute value compared to others.

When receiving the retransmission matrix $\tilde{S}$ (i.e., the (i+1)-th transmission signal), the receiving unit 200 calculates an LLR vector B formed of respective LLR values of a plurality of bits or a plurality of symbols of the retransmission matrix $\tilde{S}$ by using the STC decoder 230, in step S310. Herein, the LLR vector B is formed of the LLR values $b_1$ to $b_k$ of the bits or symbols, and k denotes the number of all bits or symbols of the LLR vector B.

Meanwhile, an LLR vector A formed of respective LLR values of a plurality of bits or a plurality of symbols that form the initial transmission matrix S (i.e., the i-th transmission signal) has been already calculated by the STC decoder 230 when receiving the i-th transmission signal and stored in the LLR calculator 240, in step S320. Herein, the LLR vector A is formed of the LLR values $a_1$ to $a_k$ of bits or symbols, and k denotes the number of all bits or symbols of the LLR vector A.

The LLR calculator 240 sets a bit number or a symbol number to "1" in step S330, and compares the bit number or symbol number and the number of all bits or symbols, in step S340. When the bit number or symbol number is less than or equal to the number of all bits or symbols, the LLR calculator 240 compares an absolute value of $b_1$ of the LLR vector B and an absolute value of $a_1$ of the LLR vector A in step S350. The LLR calculator 240 selects an LLR value having a larger absolute value among $a_1$ and $b_1$ according to a result of the comparison in step S350 and stores the selected value, in steps S360 and S370. The LLR calculator 240 increases the bit number or symbol number by 1 in step S380 and returns to the step S340. When the bit number or symbol number is greater than the number of all bits or symbols, the LLR calculator 240 forwards an LLR vector formed with LLR values of bits or symbols that were selected and stored in step S360 or S370 to the channel decoder 250, and terminates the LLR soft-combining process in step S390.

A STC-combining process performed in the third process will now be described.

Figure 4:
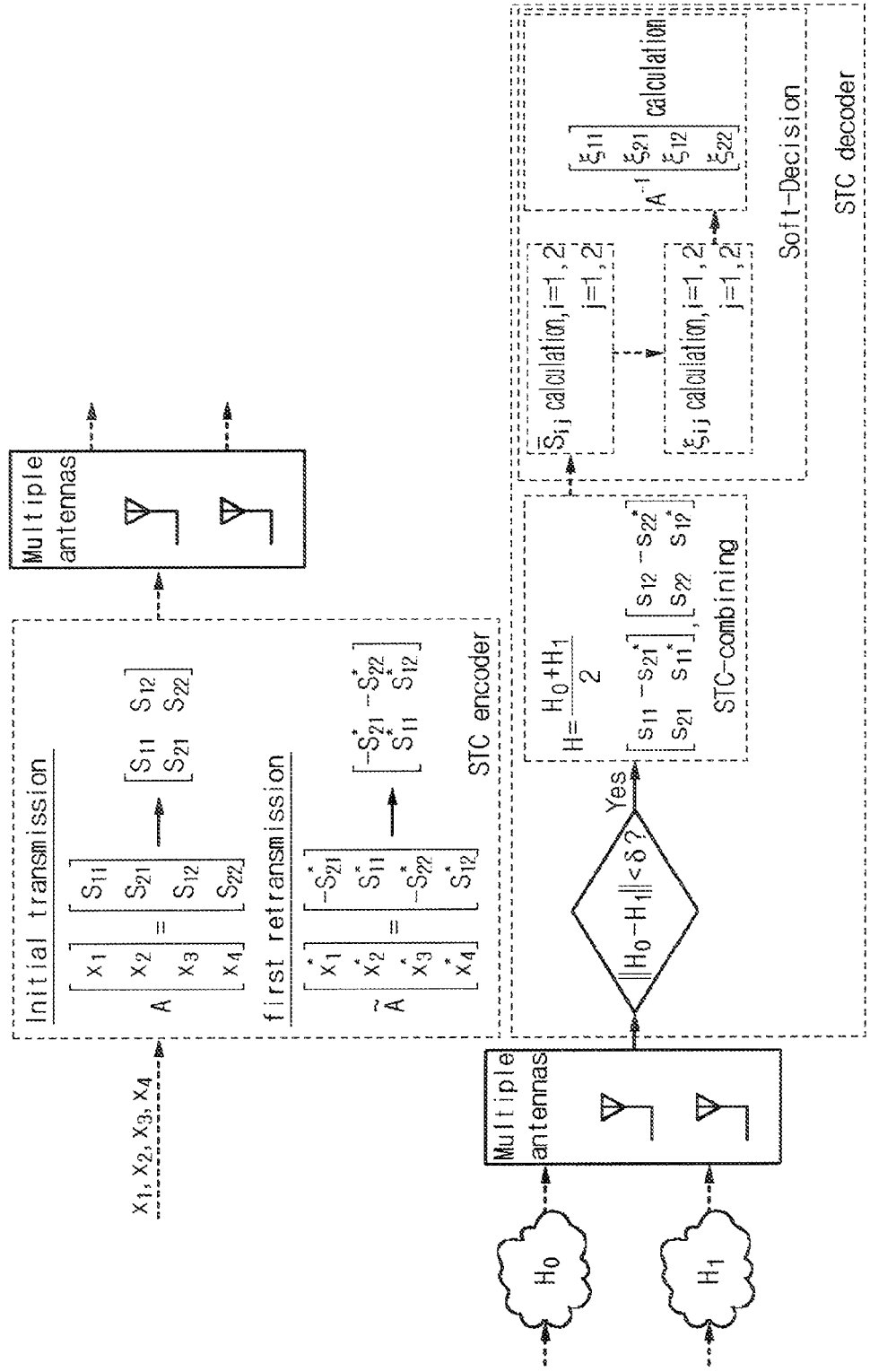
FIG. 4 is a block diagram of a process of STC combining and soft-decision performed on an initial transmission signal and a retransmission signal according to the exemplary embodiment of the present invention.

A channel matrix is a matrix whose (i, j)-th element is a fading coefficient number of a signal received at the i-th receive antenna from the j-th transmit antenna. When a channel matrix of initial transmission is $H_0$ and a channel matrix of first retransmission is $H_1$, the (i, j)-th element of the channel matrix H used for the STC combining corresponds to a mean value of the (i, j)-th element of the channel matrix $H_0$ and the (i, j)-th element of the channel matrix $H_1$. When the i-th column vectors of the initial transmission matrix S and the retransmission matrix $\tilde{S}$ are respectively set to $S_i$ and $\tilde{S}_i$, an initial receiving signal column vector and a retransmitted receiving signal column vecot are respectively set to $R_i$ and $\tilde{R}_i$, and noise column vectors that are added when the receiving terminal estimates received signal vectors $R_i$ and $\tilde{R}_i$ are respectively set to $n_i$ and $m_i$, the STC combining can be represented as given by Math Figure 4. Herein, the initial receiving signal column vector and the retransmitted receiving signal column vector correspond to $S_i$ and $\tilde{S}_i$, respectively.

$$[R_i \tilde{R}_i] = H[S_i \tilde{S}_i] + [n_i m_i], i=1, \ldots, T \qquad \text{[Math Figure 4]}$$

(where T denotes the size of a space-time encoding block).

When the channel variation range is less than the reference value and thus the second and third processes are sequentially performed, the LLR calculator 240 selects one of the LLR vectors obtained through the second and third processes and forwards the selected LLR vector to the channel decoder 250. In order to select one LLR vector among two LLR vectors, the LLR calculator 240 calculates a mean value of absolute values of LLRs of the two LLR vectors and a standard deviation of the absolute values of the LLRs. According to this calculation, the LLR calculator 240 selects an LLR vector having a larger mean value of the absolute values of the LLRs and a lower standard deviation of the absolute values of the LLRs among the two LLR vectors.

Figure 5:
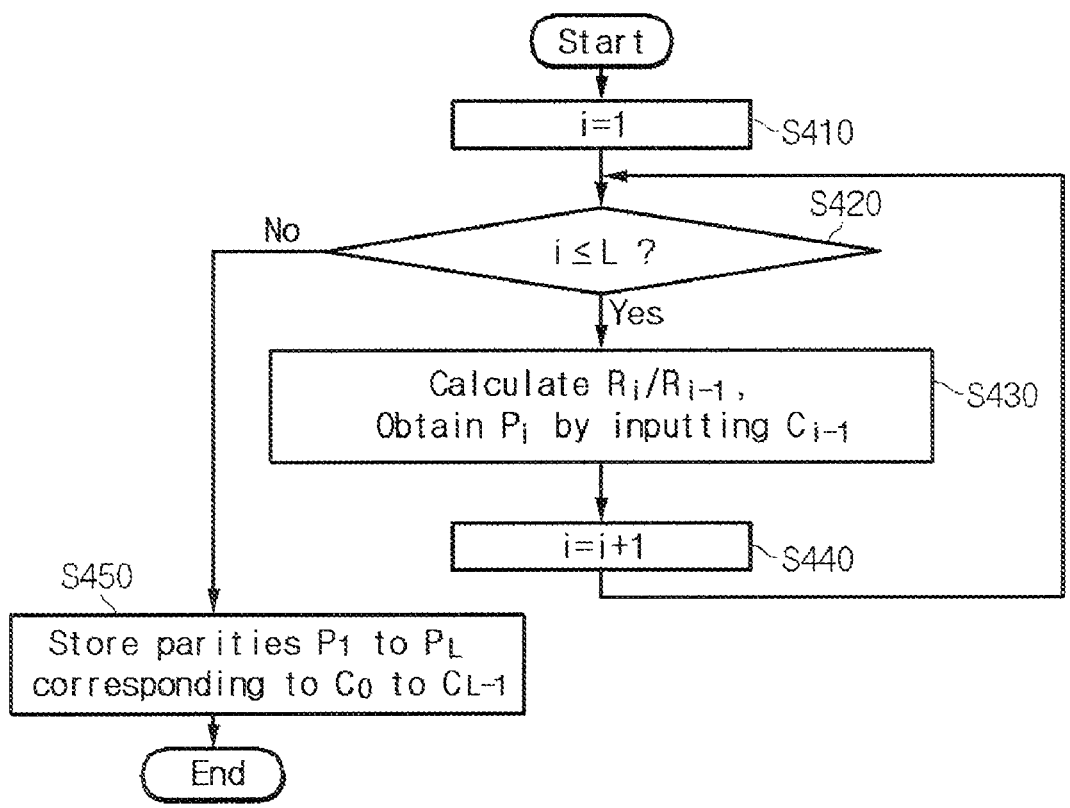
FIG. 5 is a block diagram for explaining generation of a parity included in a retransmission signal according to the exemplary embodiment of the present invention.

When two receive antennas are provided, the STC-combining performed in the third process can be given by Math Figure 5.

$$\begin{bmatrix} R_{11} & Y_{11} \\ R_{21} & Y_{21} \end{bmatrix} = \begin{bmatrix} h_{11} & h_{12} \\ h_{21} & h_{22} \end{bmatrix} \cdot \begin{bmatrix} S_{11} & -S_{21}^* \\ S_{21} & S_{11}^* \end{bmatrix} + \begin{bmatrix} n_{11} & m_{11} \\ n_{21} & m_{21} \end{bmatrix},$$
$$\begin{bmatrix} R_{12} & Y_{12} \\ R_{22} & Y_{22} \end{bmatrix} = \begin{bmatrix} h_{11} & h_{12} \\ h_{21} & h_{22} \end{bmatrix} \cdot \begin{bmatrix} S_{12} & -S_{22}^* \\ S_{22} & S_{12}^* \end{bmatrix} + \begin{bmatrix} n_{12} & m_{12} \\ n_{22} & m_{22} \end{bmatrix}$$ [Math Figure 5]

(where $h_{ij}$ denotes a fading coefficient number of the j-th transmit antenna and the i-th receive antenna, $R_{ij}$ denotes a signal received at the i-th receive antenna for the j-th column of the transmission matrix during initial transmission, $Y_{ij}$ denotes a signal received at the i-th receive antenna for the j-th column of the transmission matrix during retransmission, and $n_{ij}$ and $m_{ij}$ respectively denote additive noises for $R_{ij}$ and $Y_{ij}$).

Figure 6:
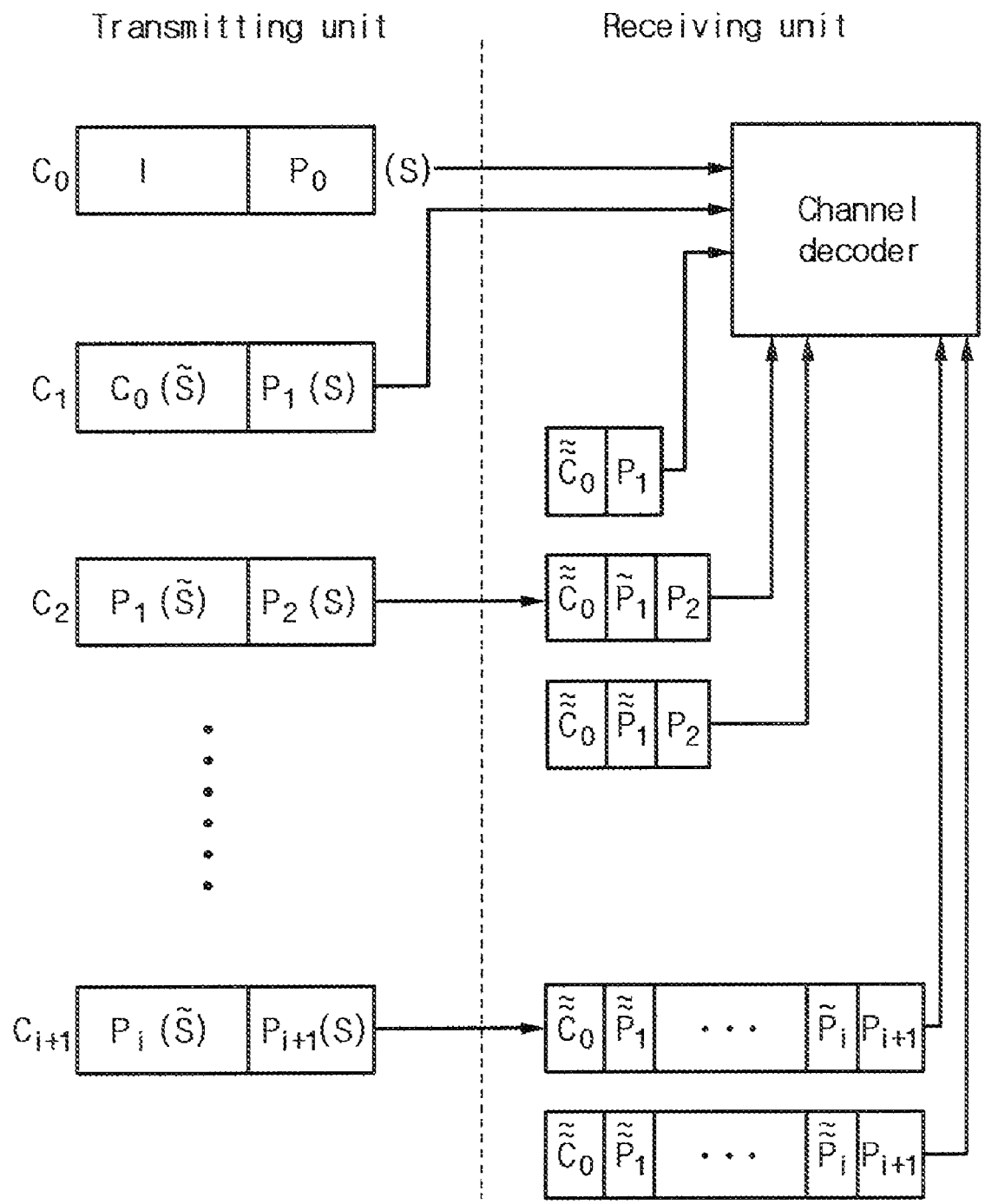
FIG. 6 is a block diagram of a type-II retransmission scheme according to an exemplary embodiment of the present invention.

Derived from Math Figure 5, a maximum likelihood (ML) soft decision for each $S_{ij}$ can be calculated by Math Figure 6.

$$\overline{S}_{1j} = h_{11}^* R_{1j} + h_{12} Y_{1j}^* + h_{21}^* R_{2j} + h_{22} Y_{2j}^*, \; j=1,2$$

$$\overline{S}_{2j} = h_{12}^* R_{1j} - h_{11} Y_{1j}^* + h_{22}^* R_{2j} - h_{21} Y_{2j}^*$$ [Math Figure 6]

(where $\overline{S}_{ij}$ denotes ML soft decision of $S_{ij}$)

Since the initial transmission matrix S is formed of linear mappings of symbols $x_1$ to $x_4$ and their conjugates, the ML soft decision of the symbols $x_1$ to $x_4$ can be obtained by linear demapping of the ML soft-decision elements of the initial transmission matrix S.

Figure 7:
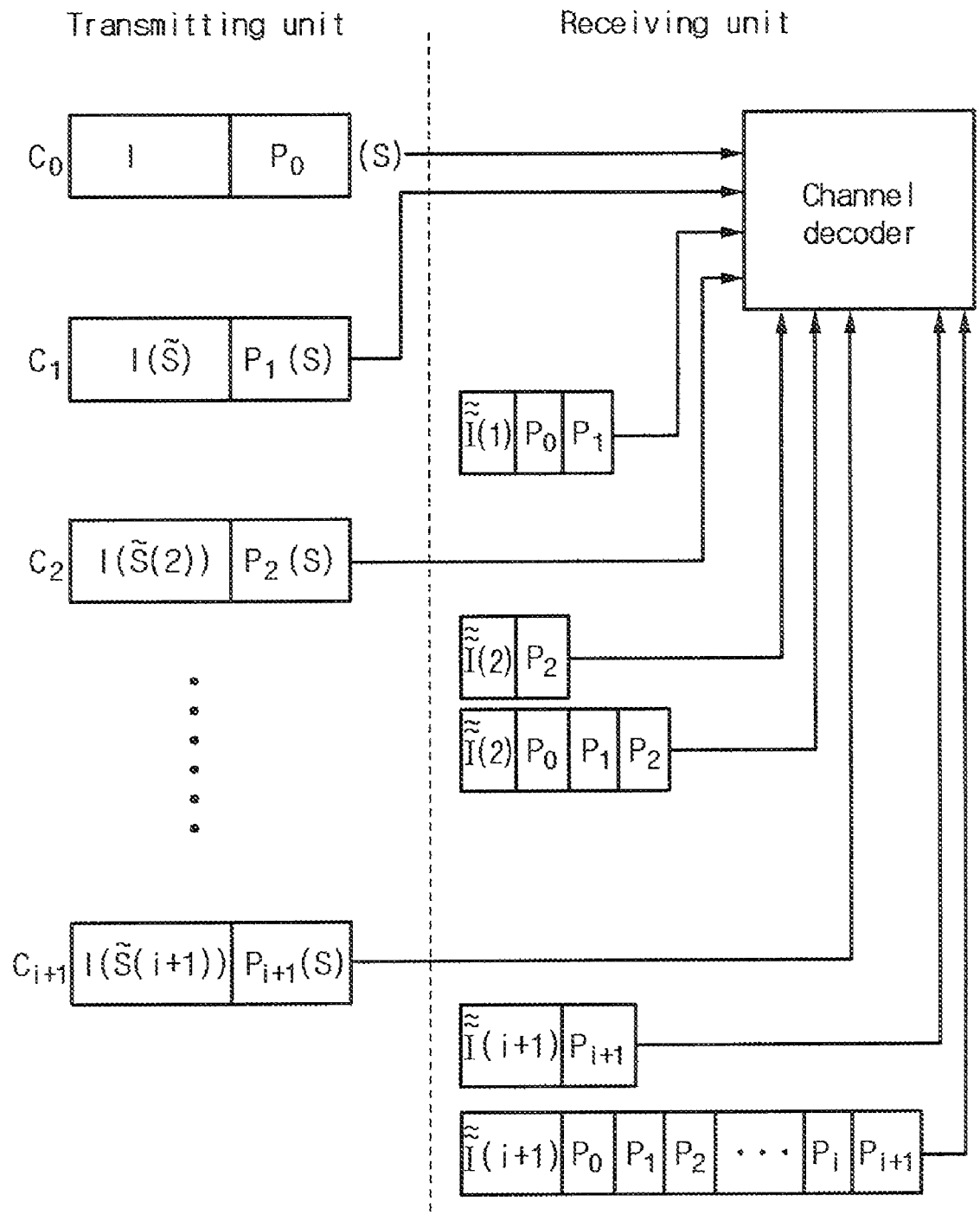
FIG. 7 is a block diagram of a type-III retransmission scheme according to an exemplary embodiment of the present invention.

When two transmit antennas, N receive antennas, and a space-time encoding block having the size of T are provided, the initial transmission matrix S and the retransmission matrix $\tilde{S}$ can be represented as the following 2×T matrix, respectively.

$$S = \begin{bmatrix} S_{11} & S_{12} & \ldots & S_{1T} \\ S_{21} & S_{22} & \ldots & S_{2T} \end{bmatrix},$$
$$\tilde{S} = \begin{bmatrix} -S_{21}^* & -S_{22}^* & \ldots & -S_{2T}^* \\ S_{11}^* & S_{12}^* & \ldots & S_{1T}^* \end{bmatrix}$$ [Math Figure 7]

In this case, the retransmission matrix $\tilde{S}$ can obtain efficient capacity and diversity gain since the retransmission matrix $\tilde{S}$ has the same capacity and diversity as those of the initial transmission matrix S.

When the channel variation range is less than the reference value and thus the third process is performed, Math Figure 5 can be generalized as Math Figure 8.

$$\begin{bmatrix} R_{1j} & Y_{1j} \\ \vdots & \vdots \\ R_{Nj} & Y_{Nj} \end{bmatrix} = \begin{bmatrix} h_{11} & h_{12} \\ \vdots & \vdots \\ h_{N1} & h_{N2} \end{bmatrix} \cdot \begin{bmatrix} S_{1j} & -S_{2j}^* \\ S_{2j} & S_{1j}^* \end{bmatrix} +$$
$$\begin{bmatrix} n_{1j} & m_{1j} \\ \vdots & \vdots \\ n_{Nj} & m_{Nj} \end{bmatrix}, \; j = 1, 2, \ldots, T$$ [Math Figure 8]

(where $h_{ij}$ denotes a fading coefficient number of the i-th receive antenna and the j-th transmit antenna, $R_{ij}$ denotes a signal that the i-th receive antenna receives for the j-th column of the initial transmission matrix, $Y_{ij}$ denotes a signal that the i-th receive antenna receives for the j-th column of the retransmission matrix, $n_{ij}$ and $m_{ij}$ respectively denote the additive noises related to $R_{ij}$ and $Y_{ij}$).

When N receive antennas and a space-time encoding block having the size of T are provided, Math Figure 6 can be generalized as given by Math Figure 9.

$$\overline{S}_{1j} = \sum_{i=1}^{N} (h_{i1}^* R_{ij} + h_{i2} Y_{ij}^*), \; j = 1, 2, \ldots, T$$ [Math Figure 9]

$$\overline{S}_{2j} = \sum_{i=1}^{N} (h_{i2}^* R_{ij} - h_{i1} Y_{ij}^*)$$

Math Figure 10 shows an ML soft decision of $S_{ij}$ (i=1, 2, j=1, ..., T) from Math Figure 8 and Math Figure 9.

$$\xi_{ij} = \frac{1}{\sum_{k=1}^{2} \sum_{l=1}^{N} |h_{lk}|^2} \overline{S}_{ij}$$ [Math Figure 10]

(where $\xi$ denotes an ML soft decision performed on the initial transmission matrix S).

From Math Figure 8 and Math Figure 10, $$\xi_{ij} = S_{ij} + \eta_{ij}$$ [Math Figure 11]

(where $\eta_{ij}$ denotes a linear combination of $h_{lk}$, $n_{ef}$, and $m_{ef}$ (e=1, ..., N, f=1, ..., T)).

In this case, when $n_{ef}$ and $m_{ef}$ denote additive white Gaussian Noises (AWGN) having distribution of $CN(0,\sigma^2)$, the distribution of $\eta_{ij}$ is also $CN(0,\sigma^2)$. The initial transmission matrix S is a linear dispersion code formed of symbols $x_1$ to $x_Q$, and it can be represented by a linear mapping function F as follows.

$$S = F(x_1, x_2, \ldots, x_Q)$$ [Math Figure 12]

Math Figure 12 can be represented as Math Figure 13 by using a coefficient matrix A.

$$\begin{bmatrix} S_{11} \\ S_{21} \\ \vdots \\ S_{1T} \\ S_{2T} \end{bmatrix} = A \begin{bmatrix} x_1 \\ x_2 \\ \vdots \\ x_Q \end{bmatrix}$$ [Math Figure 13]

From Math Figure 11 to Math Figure 13, $$F^{-1}(\xi) = \begin{bmatrix} x_1 \\ \vdots \\ x_Q \end{bmatrix} + F^{-1}(\eta)$$ [Math Figure 14]

In this case, the distribution of $F^{-1}(\eta)$ is still equivalent to $\eta$. Therefore, LLR values of the symbols $x_1$ to $x_Q$ can be obtained from $F^{-1}(\xi)$ by using Math FIG. 14. Herein, the LLR values of the symbols $x_1$ to $x_Q$ can be obtained from $F^{-1}(\xi)$ that can be measured and calculated in the receiving unit 200. Since the LLR values have been influenced by the SNR gain obtained from the STC-combining of Math Figure 9, error correction performance of the channel decoder 250 can be improved.

FIG. 4 is a block diagram showing a process for performing STC-combining and soft-decision on the initial transmission signal and the retransmission signal according to the exemplary embodiment of the present invention.

FIG. 4 shows a process performed through Math Figure 5 to Math Figure 14 in the case that the number of transmit antennas, the number of receive antennas, and the size of the space-time encoding block are all equal to 2.

During initial transmission, the STC encoder 140 of the transmitting unit 100 receives interleaved symbols $x_1$ to $x_4$, encodes the symbols by using the coefficient matrix A, and generates an initial transmission matrix S as given by Math Figure 2. Subsequently, the transmitting unit 100 receives a NACK signal from the receiving unit 200, encodes conjugate complexes $x_1^*$ to $x_4^*$ by using a coefficient matrix $\tilde{A}$, and generates a retransmission matrix $\tilde{S}$, wherein the conjugate complexes $x_1^*$ to $x_4^*$ are conjugate complexes of the symbols $x_1$ to $x_4$. At this time, the coefficient matrices A and $\tilde{A}$ are given by Math Figure 15.

$$A = \begin{bmatrix} a_{11} & a_{12} & a_{13} & a_{14} \\ a_{21} & a_{22} & a_{23} & a_{24} \\ a_{31} & a_{32} & a_{33} & a_{34} \\ a_{41} & a_{42} & a_{43} & a_{44} \end{bmatrix},$$ [Math Figure 15]

$$\tilde{A} = \begin{bmatrix} -a_{21}^* & -a_{22}^* & -a_{23}^* & -a_{24}^* \\ a_{11}^* & a_{12}^* & a_{13}^* & a_{14}^* \\ -a_{41}^* & -a_{42}^* & -a_{43}^* & -a_{44}^* \\ a_{31}^* & a_{32}^* & a_{33}^* & a_{34}^* \end{bmatrix}$$

The receiving unit 200 measures a fading coefficient matrix generated when receiving the initial transmission matrix S and the retransmission matrix $\tilde{S}$, respectively. Hereinafter, the fading coefficient matrix measured when receiving the initial transmission matrix S is denoted by $H_0$, and the fading coefficient matrix measured when receiving the retransmission matrix $\tilde{S}$ is denoted by $H_1$.

The STC decoder 230 of the receiving unit 200 compares the size of $H_0$ and the size of $H_1$. When the channel variation range is less than a predetermined reference value $\delta$, the STC decoder 230 divides a sum of $H_0$ and $H_1$ by 2 and obtains a mean fading coefficient matrix H, and simultaneously obtains $$\begin{bmatrix} S_{11} & -S_{21}^* \\ S_{21} & S_{11}^* \end{bmatrix}$$

and $$\begin{bmatrix} S_{12} & -S_{22}^* \\ S_{22} & S_{12}^* \end{bmatrix}.$$

Then, the STC decoder 230 performs STC soft-decision by using Math Figure 5 through the following process.

The STC decoder 230 calculates a value of $\bar{S}_{ij}$ corresponding to the number of transmit antennas and receive antennas, and calculates a value of $\xi_{ij}$ by using the value of $\bar{S}_{ij}$. As shown in Math Figure 14, a soft-decision value is obtained by multiplying the calculated value of $\xi_{ij}$ and a coefficient matrix $A^{-1}$.

The case in which three transmit antennas, N receive antennas, and a space-time encoding block having the size of T are provided will now be described. In this case, the initial transmission matrix S is a 3×T matrix, and a symbol index Q is Q=min(3, N)·T or Q<min(3, N)·T. When receiving the NACK signal from the receiving unit 200 and thus retransmitting an information word that has been transmitted in the form of the initial transmission matrix S, the transmitting unit 100 encodes a first retransmission matrix $\tilde{S}$ into one of the forms obtained by Math Figure 16 to Math Figure 18.

$$\tilde{S} = \begin{bmatrix} -S_{21}^* & -S_{22}^* & \ldots & -S_{2T}^* \\ S_{11}^* & S_{12}^* & \ldots & S_{1T}^* \\ S_{31}^* & S_{32}^* & \ldots & S_{3T}^* \end{bmatrix}$$ [Math Figure 16]

$$\tilde{S} = \begin{bmatrix} -S_{31}^* & -S_{32}^* & \ldots & -S_{3T}^* \\ S_{21}^* & S_{22}^* & \ldots & S_{2T}^* \\ S_{11}^* & S_{12}^* & \ldots & S_{1T}^* \end{bmatrix}$$ [Math Figure 17]

$$\tilde{S} = \begin{bmatrix} S_{11}^* & S_{12}^* & \ldots & S_{1T}^* \\ -S_{31}^* & -S_{32}^* & \ldots & -S_{3T}^* \\ S_{21}^* & S_{22}^* & \ldots & S_{2T}^* \end{bmatrix}$$ [Math Figure 18]

Through Math Figure 16 to Math Figure 18, the first retransmission matrix $\tilde{S}$ corresponds to a linear dispersion code, and has the same capacity and diversity as those of the initial transmission matrix S. Therefore, an efficient gain can be obtained through the second process.

In the case that the channel variation range is less than the reference value and thus the third process is performed, the STC-combining performed over Math Figure 16 to Math Figure 18 are respectively given by Math Figure 19 to Math Figure 21.

$$\begin{bmatrix} R_{1j} & Y_{1j} \\ R_{2j} & Y_{2j} \\ \vdots & \vdots \\ R_{Nj} & Y_{Nj} \end{bmatrix} = \begin{bmatrix} h_{11} & h_{12} & h_{13} \\ h_{21} & h_{22} & h_{23} \\ \vdots & \vdots & \vdots \\ h_{N1} & h_{N2} & h_{N3} \end{bmatrix} \begin{bmatrix} S_{1j} & -S_{2j}^* \\ S_{2j} & S_{1j}^* \\ S_{3j} & S_{3j}^* \end{bmatrix} +$$ [Math Figure 19]

$$\begin{bmatrix} n_{1j} & m_{1j} \\ n_{2j} & m_{2j} \\ \vdots & \vdots \\ n_{Nj} & m_{Nj} \end{bmatrix}, j = 1, 2, \ldots, T$$

$$\begin{bmatrix} R_{1j} & Y_{1j} \\ R_{2j} & Y_{2j} \\ \vdots & \vdots \\ R_{Nj} & Y_{Nj} \end{bmatrix} = \begin{bmatrix} h_{11} & h_{12} & h_{13} \\ h_{21} & h_{22} & h_{23} \\ \vdots & \vdots & \vdots \\ h_{N1} & h_{N2} & h_{N3} \end{bmatrix} \begin{bmatrix} S_{1j} & -S_{3j}^* \\ S_{2j} & S_{2j}^* \\ S_{3j} & S_{1j}^* \end{bmatrix} +$$ [Math Figure 20]

$$\begin{bmatrix} n_{1j} & m_{1j} \\ n_{2j} & m_{2j} \\ \vdots & \vdots \\ n_{Nj} & m_{Nj} \end{bmatrix}, j = 1, 2, \ldots, T$$

$$\begin{bmatrix} R_{1j} & Y_{1j} \\ R_{2j} & Y_{2j} \\ \vdots & \vdots \\ R_{Nj} & Y_{Nj} \end{bmatrix} = \begin{bmatrix} h_{11} & h_{12} & h_{13} \\ h_{21} & h_{22} & h_{23} \\ \vdots & \vdots & \vdots \\ h_{N1} & h_{N2} & h_{N3} \end{bmatrix} \begin{bmatrix} S_{1j} & S_{1j}^* \\ S_{2j} & -S_{3j}^* \\ S_{3j} & S_{2j}^* \end{bmatrix} +$$ [Math Figure 21]

$$\begin{bmatrix} n_{1j} & m_{1j} \\ n_{2j} & m_{2j} \\ \vdots & \vdots \\ n_{Nj} & m_{Nj} \end{bmatrix}, j = 1, 2, \ldots, T$$

When the third process is performed, a soft-decision value of $S_{ij}$ is obtained by performing the STC-combining on each column $j$ ($1 \leq j \leq T$) through Math Figure 19 to Math Figure 21. In such a way, a soft-decision value $\xi$ of the initial transmission matrix S is obtained and used for obtaining LLR values of symbols $x_1$ to $x_Q$ that form the information word of Math Figure 14.

The columns of each retransmission matrix presented from Math Figure 16 to Math Figure 18 are formulated by the same modification rule.

However, the present embodiment may provide other candidates of retransmission matrix, whose columns are formulated by different formats appeared from Math Figure 16 to Math Figure 18. For example, the retransmission matrix $\tilde{S}$ can be represented as shown in Math Figure 22.

$$\tilde{S} = \begin{bmatrix} -S_{21}^* & -S_{32}^* & \ldots & S_{1T}^* \\ S_{11}^* & S_{22}^* & \ldots & -S_{3T}^* \\ S_{31}^* & S_{12}^* & \ldots & S_{2T}^* \end{bmatrix}$$ [Math Figure 22]

In this case, each column $j$ ($1 \leq j \leq T$) is soft-combined by using one of Math Figure 19 to Math Figure 21 in accordance with its format.

In the following case, four transmit antennas, N receive antennas, and a space-time encoding block having the size of T are provided. In this case, the initial transmission matrix S is a 4×T matrix, and the symbol index Q is Q=min(4, N)·T or Q<min(4, N)·T. When receiving the NACK signal, the transmitting unit 100 encodes the first transmitted codeword with the first retransmission matrix $\tilde{S}$ as shown in Math Figure 23 and retransmits these retransmission signals to the receiving unit 200.

$$\tilde{S} = \begin{bmatrix} -S_{21}^* & -S_{22}^* & \cdots & -S_{2T}^* \\ S_{11}^* & S_{12}^* & \cdots & S_{1T}^* \\ -S_{41}^* & -S_{42}^* & \cdots & -S_{4T}^* \\ S_{31}^* & S_{32}^* & \cdots & S_{3T}^* \end{bmatrix}$$ [Math Figure 23]

When an error is still detected in the receiving unit 200 after the transmitting unit 100 that has received the NACK signal performs the first retransmission, the second retransmission is performed. When an error is detected after performing the second retransmission, the third retransmission is performed. When performing the second retransmission, a retransmission matrix $\tilde{S}(2)$ given by Math Figure 24 to Math Figure 26 is respectively used. Herein, the number of transmit antennas is respectively set to 2, 3, and 4 in Math Figures 24, 25, and 26 while N receive antennas and a space-time encoding block having the size of T are provided for each case.

When the number of transmit antennas is set to 2, $$\tilde{S}(2) = \begin{bmatrix} S_{11} & S_{12} & \cdots & S_{1T} \\ S_{21} & S_{22} & \cdots & S_{2T} \end{bmatrix}$$ [Math Figure 24]

When the number of transmit antennas is set to 3, $$\tilde{S}(2) = \begin{bmatrix} S_{11} & S_{12} & \cdots & S_{1T} \\ S_{21} & S_{22} & \cdots & S_{2T} \\ S_{31} & S_{32} & \cdots & S_{3T} \end{bmatrix}$$ [Math Figure 25]

When the number of transmit antennas is set to 4, $$\tilde{S}(2) = \begin{bmatrix} S_{11} & S_{12} & \cdots & S_{1T} \\ S_{21} & S_{22} & \cdots & S_{2T} \\ S_{31} & S_{32} & \cdots & S_{3T} \\ S_{41} & S_{42} & \cdots & S_{4T} \end{bmatrix}$$ [Math Figure 26]

When four transmit antennas are provided, the retransmission matrix $\tilde{S}(2)$ given by Math Figure 27 may replace the retransmission matrix $\tilde{S}(2)$ given by Math Figure 26.

$$\tilde{S}(2) = \begin{bmatrix} S_{31} & S_{32} & \cdots & S_{3T} \\ S_{41} & S_{42} & \cdots & S_{4T} \\ S_{11} & S_{12} & \cdots & S_{1T} \\ S_{21} & S_{22} & \cdots & S_{2T} \end{bmatrix}$$ [Math Figure 27]

When the error is detected after performing the second retransmission and thus the third retransmission is performed, a retransmission matrix $\tilde{S}(3)$ used for the third retransmission is the same as the retransmission matrix $\tilde{S}$ used for the first retransmission as shown in Math Figure 28.

$$\tilde{S}(3) = \tilde{S}$$ [Math Figure 28]

When the number of retransmissions increases, transmission of a signal through a plurality of antennas can be processed as follows.

When three transmit antennas are provided, the transmitting unit 100 sequentially uses Math Figure 16, Math Figure 17, and Math Figure 18 for the first, third, and fifth retransmissions, respectively. When four transmit antennas are provided and the retransmission matrix $\tilde{S}(2)$ given by Math Figure 27 is used for the second retransmission, a retransmission matrix $\tilde{S}(3)$ used for the third retransmission is given by Math Figure 29 rather than Math Figure 28.

$$\tilde{S}(3) = \begin{bmatrix} -S_{41}^* & -S_{42}^* & \cdots & -S_{4T}^* \\ S_{31}^* & S_{32}^* & \cdots & S_{3T}^* \\ -S_{21}^* & -S_{22}^* & \cdots & -S_{2T}^* \\ S_{11}^* & S_{12}^* & \cdots & S_{1T}^* \end{bmatrix}$$ [Math Figure 29]

When the retransmission matrix $\tilde{S}(3)$ given by Math Figure 28 is used for the third retransmission, $\tilde{S}(\text{even}) = \tilde{S}(2)$ and $\tilde{S}(\text{odd}) = \tilde{S}$ are respectively applied to an even-numbered retransmission matrix $\tilde{S}(\text{even})$ and an odd-numbered retransmission matrix $\tilde{S}(\text{odd})$ until the number of retransmissions reaches a maximum limit. However, when the retransmission matrix $\tilde{S}(3)$ given by Math Figure 29 is used for the third retransmission, $\tilde{S}(n)=\tilde{S}(n_{mod\ 4})$ is applied until the number of retransmissions reaches the maximum limit. Herein, $\tilde{S}(0)=S$ and $\tilde{S}(1)=\tilde{S}$. Accordingly, the first retransmission matrix to the last retransmission matrix respectively have the same capacity and diversity gain as those of the initial transmission matrix S. In addition, the receiving unit 200 that has received the retransmission matrix $\tilde{S}$ from the transmitting unit 100 obtains an LLR vector through the first to third processes and performs error correction and error checking.

The above-stated retransmission scheme applied to the MIMO system that uses the hybrid ARQ has been focused on the type-I retransmission scheme (i.e., chase combining) among the three types of retransmission schemes. Hereinafter, the type-II and type-III retransmission schemes will be described. The type-II and type-III retransmission schemes use incremental redundancy transmission.

The initial transmission matrix S, the retransmission matrix $\tilde{S}$, and conversion of the retransmission $\tilde{S}$ can be applied to the type-II and type-III retransmission schemes. According to the type-II and type-III retransmission schemes, the transmitting unit 100 that has received a retransmission request adds a parity to an initial transmission signal or partially attaches the parity to the initial transmission signal and generates a retransmission signal, and then transmits the retransmission signal to the receiving unit 200. In this case, generation of the additional parity applied to both the second and third types of retransmission schemes will be described with reference to FIG. 5.

FIG. 5 is a block diagram for explaining generation of a parity attached to a retransmission signal according to an exemplary embodiment of the present invention.

The channel encoder 120 of the transmitting unit 100 repeatedly generates parities that compose retransmission signals by a predetermined maximum number of retransmissions in advance to process a retransmission request when transmitting information so as to support a hybrid ARQ. A process for the generation of parities is as follows.

The number of retransmissions of a signal from the transmitting unit 100 to the receiving unit 200 is denoted by i, and parities generated by a predetermined maximum number of retransmissions L are respectively denoted by $P_1$ to $P_L$. In addition, $R_i$ denotes a code rate, and the sizes of an initial code rate $R_0$ and code rates $R_1$ to $R_L$ that correspond to the number of retransmissions i (i=1 to L) are respectively predetermined to $R_0 > R_1 > \ldots > R_L$. When a notation of $P_0 P_1 \ldots P_i$ implies that parities $P_0, P_1, \ldots P_i$ are consecutively attached, parity $P_0$, parity $P_0 P_1, \ldots,$ parity $P_0 P_1 \ldots P_i$ respectively correspond to code rates $R_0, R_1, \ldots, R_i$.

The channel encoder 120 sets the number of retransmissions i to 1 in step S410, and compares i and the predetermined maximum number of retransmissions L in step S420. When i is equal to or less than L, the channel encoder 120 calculates $R_1/R_0$ by using predetermined code rates $R_0$ and $R_1$ and inputs a result of the calculation as a code rate for encoding, and inputs $C_0$ such that parity $P_1$ for $C_o$ is calculated, in step S430. The channel encoder 120 increases i by 1 in step S440, and returns to step S420. When i is greater than L according to a result of the comparison of step S420, the channel encoder 120 stores $P_1$ to $P_L$ for $C_o$ to $C_{L-1}$ in step S450 and terminates the parity generation process.

The second type of the retransmission scheme will now be described with reference to FIG. 6 and the above-described generation of additional parity of FIG. 5.

FIG. 6 is a block diagram of the second type of the retransmission scheme according to an exemplary embodiment of the present invention. The transmitting unit 100 encodes an initial transmission signal $C_0$ (hereinafter, referred to as $C_0$) into the initial transmission matrix S and transmits the initial transmission matrix S. The channel decoder 230 of the receiving unit 200 decodes $C_0$ transmitted from the transmitting unit 100 and checks errors. When no error is detected, the receiving unit 200 transmits an ACK signal to the transmitting unit 100. Otherwise, the receiving unit 200 transmits a NACK signal to the transmitting unit 100.

When receiving the NACK signal, the receiving unit 200 generates a retransmission signal $C_1$ (hereinafter, referred to as $C_1$) and transmits $C_1$ to the transmitting unit 100. $C_1$ is formed by encoding symbols that form $C_0$ into the form of a retransmission matrix $\tilde{S}$ after attaching parity $P_1$ to $C_0$, and the parity $P_1$ is encoded into the form of an initial transmission matrix S. Hereinafter, $C_0$ that has been transmitted in the form of the retransmission matrix $\tilde{S}$ is denoted by $\tilde{C}_0$.

The channel decoder 230 of the receiving unit 200 decodes $C_1$ transmitted from the transmitting unit 100 and checks errors. When no error is detected, the receiving unit 200 transmits an ACK signal to the receiving unit 200, and deletes $C_0$ and $C_0$ so as to be ready to receive the next signal from the transmitting unit 100.

When an error is detected in $C_1$, $\tilde{C}_0$ and $C_0$ are combined through the first process, the second process, or the first to third processes, and a result of the combining of $\tilde{C}_0$ and $C_0$ is decoded by the channel decoder 250 together with parity $P_1$ and error checking is performed. The first to third processes have been introduced in the chase combining scheme. Herein, the result of the combining of $\tilde{C}_0$ and $C_0$ is denoted by $\tilde{\tilde{C}}_0$.

When an error is checked again, the receiving unit 200 transmits a NACK signal to the transmitting unit 100. When receiving the NACK signal, the transmitting unit 100 generates a second retransmission signal $C_2$ (hereinafter, referred to as $C_2$) and transmits $C_2$ to the receiving unit 200. $C_2$ is formed by attaching parity $P_2$ to parity $P_1$ and then encoding parity $P_1$ into the form of the retransmission matrix $\tilde{S}$ and $P_2$ into the form of the initial transmission matrix S. Hereinafter, parity $P_1$ transmitted in the form of the retransmission matrix $\tilde{S}$ is denoted as $\tilde{P}_1$.

The channel decoder 230 of the receiving unit 200 decodes $\tilde{\tilde{C}}_0$ and LLR vectors of $\tilde{P}_1$ and $P_2$ together and checks errors. When an error is detected again, vector $\tilde{\tilde{P}}_1$ formed of LLR values that are obtained by combining parities $P_1$ and $\tilde{P}_1$ through the first process, the second process, or the first to third processes, and $\tilde{\tilde{C}}_0$, $\tilde{\tilde{P}}_1$, and $P_2$ are decoded together.

When an error is still detected after the i-th retransmission is performed by repeating the above-stated process, the transmitting unit 100 generates the (i+1)-th retransmission signal $C_{i+1}$ (hereinafter, referred to as $C_{i+1}$) and performs the (i+1)-th retransmission to the receiving unit 200. Herein, i is a natural number, greater than 2. $C_{i+1}$ is formed of parity $P_i$ and parity $P_{i+1}$, and the parity $P_i$ is encoded into the form of the retransmission matrix $\tilde{S}$ and the parity $P_{i+1}$ is space-time encoded into the form of the initial transmission matrix S. The channel decoder 230 of the receiving unit 200 decodes $\tilde{\tilde{C}}_0, \tilde{\tilde{P}}_1, \ldots, \tilde{\tilde{P}}_{i-1}, \tilde{P}_i$, and $\tilde{\tilde{P}}_{i+1}$ together, and checks errors. When no error is detected, the receiving unit 200 transmits an ACK signal to the transmitting unit 100 and eliminates $\tilde{\tilde{C}}_0, \tilde{\tilde{P}}_1, \ldots, \tilde{\tilde{P}}_{i-1}, \tilde{P}_1$, and $\tilde{\tilde{P}}_{i+1}$ so as to be ready to receive the next signal. However, when an error is detected again, vector $\tilde{\tilde{P}}_1$ formed of LLR values that are obtained by combining parities $P_1$ and $\tilde{P}_1$ through the first process, the second process, or the first to third processes, decodes $\tilde{\tilde{C}}_0, \tilde{\tilde{P}}_1, \ldots, \tilde{\tilde{P}}_i$, and $\tilde{\tilde{P}}_{i+1}$ together, and checks errors.

As described, since only parities are retransmitted after performing the second retransmission, the parities cannot be decoded without being combined with previously transmitted signals according to the type-II of retransmission scheme. On the other hand, unlike the type-II of retransmission scheme, signals that are transmitted by each retransmission can be decoded without being combined with previously transmitted signals according to the type-III retransmission scheme. Hereinafter, the type-III of retransmission scheme will be described with reference to FIG. 7.

FIG. 7 is a block diagram showing the third type of retransmission scheme according to an exemplary embodiment of the present invention. The transmitting unit 100 encodes an initial transmission signal $C_0$ into the form of an initial transmission matrix S and transmits the initial transmission matrix S to the receiving unit 200 in the same way as in the case of the second type of retransmission scheme.

The channel decoder 230 of the receiving unit 200 decodes $C_0$ from the transmitting unit 100 and checks errors. When no error is detected, the receiving unit 200 transmits an ACK signal to the transmitting unit 100. Otherwise, the receiving unit 200 transmits a NACK signal to the transmitting unit 100. In this case, the receiving unit 200 may transmit information on an error-detected portion of the information word that forms the initial transmission signal $C_0$ or a specific portion where a level of a detected error is greater than a predetermined reference value in the information word to the transmitting unit 100, together with the NACK signal.

When receiving the NACK signal, the transmitting unit 100 transmits the retransmission signal $C_1$ to the receiving unit 200. Herein, after the parity $P_1$ is attached to the information word or to the error-detected portion of the information word of $C_0$, the information word is encoded into the form of the retransmission matrix $\tilde{S}$ and the parity $P_1$ is encoded into the form of the initial transmission matrix S such that the retransmission signal $C_1$ is generated. Hereinafter, the information word encoded into the form of the initial transmission matrix S is denoted by I(S), and the information word encoded into the form of the retransmission matrix $\tilde{S}$ is denoted by I($\tilde{S}$).

The receiving unit 200 decodes $C_1$ transmitted from the transmitting unit 100 and checks errors therein, and transmits an ACK signal to the receiving unit 200 when no error is detected and eliminates $C_0$ and $C_1$ so as to be ready to receive the next signal from the transmitting unit 100. When an error is detected in $C_1$, I(S) and I($\tilde{S}$) are combined through the first process, the second process, or the first to third processes that have been introduced in the chase combining scheme, and the combined result is decoded with the parity $P_0$ and the parity $P_1$ by the channel decoder 250. After that, error checking is performed. Hereinafter, the combined result of I(S) and I($\tilde{S}$) is denoted by $\bar{I}(1)$.

When an error is detected in the error checking, the receiving unit 200 transmits a NACK signal to the transmitting unit 100. When receiving the NACK signal, the transmitting unit 100 transmits a second retransmission signal $C_2$ to the transmitting unit 100. Herein, after the parity $P_2$ is attached to the information word, the information word is encoded into the form of the second retransmission matrix $\tilde{S}(2)$ and the parity $P_2$ is encoded into the form of the initial transmission matrix S such that $C_2$ is generated. Hereinafter, the information word encoded into the form of the second retransmission matrix $\tilde{S}(2)$ is denoted by I($\tilde{S}(2)$).

The receiving unit 200 decodes $C_2$ transmitted from the transmitting unit 100 and checks errors therein. When an error is detected, I($\tilde{S}(2)$) and $\bar{I}(1)$ are combined through the first process, the second process, or the first to third processes that have been introduced in the chase combining scheme, and the combined result is decoded together with the parity $P_2$ by the channel decoder 250. After the decoding, error checking is performed. Hereinafter, the result of the combining of I($\tilde{S}(2)$) and $\bar{I}(1)$ is denoted by $\bar{I}(2)$.

When an error is detected in the error checking, $\bar{I}(2)$, $P_0$, $P_1$, and $P_2$ are decoded together and error checking is performed again.

When an error is still detected after the i-th retransmission is performed by repeating the above process i times, the transmitting unit 100 transmits the (i+1)-th retransmission signal $C_{i+1}$ to the receiving unit 200. Herein, $C_{i+1}$ is generated by attaching parity $P_{i+1}$ to an information word and encoding the information word into the form of the (i+1)-th retransmission matrix $\tilde{S}(i+1)$ and the parity $P_{i+1}$ into the form of the initial transmission matrix S. Hereinafter, the information word encoded into the form of the retransmission matrix $\tilde{S}(i+1)$ is denoted by I($\tilde{S}(i+1)$).

The receiving unit 200 decodes $C_{i+1}$ transmitted from the transmitting unit 100 and performs error checking. When an error is detected in $C_{i+1}$, I($\tilde{S}(i+1)$) and :I(i) are combined through the first and second processes, or the first to third processes that have been introduced in the chase combining scheme, and the result of the combination and the parity $P_{i+1}$ are decoded together by the channel decoder 250. After the decoding, error checking is performed on the decoding result. Hereinafter, the result of the combination of I($\tilde{S}(i+1)$) and :I(i) is denoted by $\bar{I}(i+1)$.

When an error is detected, $\bar{I}(i+1)$, $P_0$, $P_1$, $P_2$, ..., $P_i$, $P_{i+1}$ are decoded together and error checking is performed on the decoded result.

The above-described exemplary embodiment of the present invention may be realized by an apparatus and a method, but it may also be realized by a program that realizes functions corresponding to configurations of the exemplary embodiment or a recording medium that recodes the program. Such a realization can be easily performed by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

Advantageous Effects

With the above-described configurations, a multiple antenna transmission apparatus that can generate an efficient retransmission gain is provided. The efficient retransmission gain can be obtained by utilizing the advantages of the initial transmission matrix which is a linear dispersion code and enabling the retransmission matrix to have the same advantages as the initial transmission matrix, when a hybrid automatic repeat request (ARQ) is applied.

In addition, the multiple antenna receiving apparatus maximizes the combination effect of an initial transmission signal and the corresponding retransmission signal to improve error correction performance by using an initial transmission signal and subsequent retransmission signals.

What is claimed is:
1. A retransmission method of a transmitting apparatus that performs a hybrid automatic repeat request (ARQ), the retransmission method comprising:

(a) encoding an initial transmission signal to be transmitted into the form of an initial transmission matrix, transmitting the initial transmission signal encoded in the form of the initial transmission matrix, and receiving a result of error checking performed on the initial transmission signal from a receiving apparatus, the initial transmission matrix corresponding to a linear dispersion code; and (b) when an error is reported about the initial transmission signal, generating a first retransmission signal by encoding the initial transmission signal into the form of a retransmission matrix and transmitting the first retransmission signal, wherein the retransmission matrix is formed of constituent elements of the initial transmission matrix but is different from the initial transmission matrix, and corresponds to a linear dispersion code having the same capacity and diversity gain as those of the initial transmission matrix, wherein the initial transmission matrix is encoded from the initial transmission signal with the linear dispersion code is obtained by, $$S = \sum_{q=1}^{Q} (x_q C_q + x_q^* D_q)$$

(where $C_q$ and $D_q$ denote M×T complex matrices, x* denotes a conjugate complex number of a complex number x, $x_q$ denotes a symbol, and q denotes a symbol index).

2. The retransmission method of claim 1, wherein a transmission matrix of the N-th retransmission signal is equal to the transmission matrix of the initial transmission signal, and the transmission matrix of the (N+1)-th retransmission signal is equal to the transmission matrix of the retransmission signal (where N is a natural even number, greater than 2).

3. A retransmission method of a transmitting apparatus that performs a hybrid automatic repeat request (ARQ), the retransmission method comprising:
(a) encoding an initial transmission signal to be transmitted into the form of an initial transmission matrix, transmitting the initial transmission signal encoded in the form of the initial transmission matrix, and receiving a result of error checking performed on the initial transmission signal from a receiving apparatus, the initial transmission matrix corresponding to a linear dispersion code; and
(b) when an error is reported about the initial transmission signal, generating a first retransmission signal by encoding the initial transmission signal into the form of a retransmission matrix and transmitting the first retransmission signal, wherein the retransmission matrix is formed of constituent elements of the initial transmission matrix but is different from the initial transmission matrix, and corresponds to a linear dispersion code having the same capacity and diversity gain as those of the initial transmission matrix, wherein, in (b), the retransmission matrix is $$\begin{bmatrix} -S_{21}^* & -S_{22}^* & \cdots & -S_{2T}^* \\ S_{11}^* & S_{12}^* & \cdots & S_{1T}^* \end{bmatrix},$$

the number of transmit antennas of the transmitting apparatus is 2, the size of a space-time encoding block is T, and the initial transmission matrix is $$\begin{bmatrix} S_{11} & S_{12} & \cdots & S_{1T} \\ S_{21} & S_{22} & \cdots & S_{2T} \end{bmatrix},$$

(where T is a natural number, $S_{ij}^*$ is a conjugate of $S_{ij}$, an element $S_{ij}$ of the i-th row and j-th column is a linear combination of $x_1, \ldots, x_Q$ and $x_1^*, \ldots, x_Q^*$, $x_q$ denotes a symbol, q denotes a symbol index, and i denotes a transmit antenna number).

4. A retransmission method of a transmitting apparatus that performs a hybrid automatic repeat request (ARQ), the retransmission method comprising:
(a) encoding an initial transmission signal to be transmitted into the form of an initial transmission matrix, transmitting the initial transmission signal encoded in the form of the initial transmission matrix, and receiving a result of error checking performed on the initial transmission signal from a receiving apparatus, the initial transmission matrix corresponding to a linear dispersion code; and
(b) when an error is reported about the initial transmission signal, generating a first retransmission signal by encoding the initial transmission signal into the form of a retransmission matrix and transmitting the first retransmission signal, wherein the retransmission matrix is formed of constituent elements of the initial transmission matrix but is different from the initial transmission matrix, and corresponds to a linear dispersion code having the same capacity and diversity gain as those of the initial transmission matrix, wherein, in (b), the retransmission matrix is equal to one of the first to third retransmission matrices presented below, the number of transmit antennas of the transmitting apparatus is 3, the size of a space-time encoding block is T, and the initial transmission matrix is $$\begin{bmatrix} S_{11} & S_{12} & \cdots & S_{1T} \\ S_{21} & S_{22} & \cdots & S_{2T} \\ S_{31} & S_{32} & \cdots & S_{3T} \end{bmatrix},$$

the first retransmission matrix:

$$\begin{bmatrix} -S_{21}^* & -S_{22}^* & \cdots & -S_{2T}^* \\ S_{11}^* & S_{12}^* & \cdots & S_{1T}^* \\ S_{31}^* & S_{32}^* & \cdots & S_{3T}^* \end{bmatrix}$$

the second retransmission matrix:

$$\begin{bmatrix} -S_{31}^* & -S_{32}^* & \cdots & -S_{3T}^* \\ S_{21}^* & S_{22}^* & \cdots & S_{2T}^* \\ S_{11}^* & S_{12}^* & \cdots & S_{1T}^* \end{bmatrix}$$

the third retransmission matrix:

$$\begin{bmatrix} S_{11}^* & S_{12}^* & \cdots & S_{1T}^* \\ -S_{31}^* & -S_{32}^* & \cdots & -S_{3T}^* \\ S_{21}^* & S_{22}^* & \cdots & S_{2T}^* \end{bmatrix}$$

(where T is a natural number, $S_{ij}^*$ denotes a conjugate of $S_{ij}$, an element $S_{ij}$ of the i-th row and the j-th column is a linear combination of $x_1, \ldots, x_Q$ and $x_1^*, \ldots, x_Q^*$, $x_q$ denotes a symbol, q denotes a symbol index, and i denotes a transmit antenna number).

5. The retransmission method of claim 4, wherein, when an error is reported about the first retransmission signal, the N-th retransmission signal is encoded in the same form as the initial transmission matrix and the (N+1)-th retransmission signal is sequentially encoded into one of the forms of the first to third retransmission matrices in accordance with the number of retransmissions (where N is a natural even number, greater than 2).

6. A retransmission method of a transmitting apparatus that performs a hybrid automatic repeat request (ARQ), the retransmission method comprising:
(a) encoding an initial transmission signal to be transmitted into the form of an initial transmission matrix, transmitting the initial transmission signal encoded in the form of the initial transmission matrix, and receiving a result of error checking performed on the initial transmission signal from a receiving apparatus, the initial transmission matrix corresponding to a linear dispersion code; and
(b) when an error is reported about the initial transmission signal, generating a first retransmission signal by encoding the initial transmission signal into the form of a retransmission matrix and transmitting the first retransmission signal, wherein the retransmission matrix is formed of constituent elements of the initial transmission matrix but is different from the initial transmission matrix, and corresponds to a linear dispersion code having the same capacity and diversity gain as those of the initial transmission matrix, wherein, in (b),
the retransmission matrix is $$\begin{bmatrix} -S_{21}^* & -S_{22}^* & \cdots & -S_{2T}^* \\ S_{11}^* & S_{12}^* & \cdots & S_{1T}^* \\ -S_{41}^* & -S_{42}^* & \cdots & -S_{4T}^* \\ S_{31}^* & S_{32}^* & \cdots & S_{3T}^* \end{bmatrix},$$

the number of transmit antennas of the transmitting apparatus is 4, the size of a space-time encoding block is T, and the initial transmission matrix is $$\begin{bmatrix} S_{11} & S_{12} & \cdots & S_{1T} \\ S_{21} & S_{22} & \cdots & S_{2T} \\ S_{31} & S_{32} & \cdots & S_{3T} \\ S_{41} & S_{42} & \cdots & S_{4T} \end{bmatrix}$$

(where T is a natural number, $S_{ij}^*$ denotes a conjugate of $S_{ij}$, an element $S_{ij}$ of the i-th row and the j-th column is a linear combination of $x_1, \ldots, x_Q$ and $x_1^*, \ldots, x_Q^*$, $x_q$ denotes a symbol, q denotes a symbol index, and i denotes a transmit antenna number).

7. The retransmission method of claim 6, wherein when an error is reported about the retransmission signal, the second and third retransmission signals are respectively encoded into the forms of the second and third retransmission matrices below:

$$\tilde{S}(2) = \begin{bmatrix} S_{31} & S_{32} & \cdots & S_{3T} \\ S_{41} & S_{42} & \cdots & S_{4T} \\ S_{11} & S_{12} & \cdots & S_{1T} \\ S_{21} & S_{22} & \cdots & S_{2T} \end{bmatrix},$$

$$\tilde{S}(3) = \begin{bmatrix} -S_{41}^* & -S_{42}^* & \cdots & -S_{4T}^* \\ S_{31}^* & S_{32}^* & \cdots & S_{3T}^* \\ -S_{21}^* & -S_{22}^* & \cdots & -S_{2T}^* \\ S_{11}^* & S_{12}^* & \cdots & S_{1T}^* \end{bmatrix}$$

(where $\tilde{S}(k)$ denotes the k-th retransmission matrix).

8. A retransmission method of a transmitting apparatus that performs a hybrid automatic repeat request, the retransmission method comprising:
(a) encoding a codeword to be transmitted into the form of an initial transmission matrix and transmitting the codeword encoded in the form of the initial transmission matrix, and receiving a result of error checking performed on the codeword, the initial transmission matrix corresponding to a linear dispersion code; and
(b) when an error is reported about the codeword, attaching a first parity to the codeword for error correction and generating a first retransmission signal by encoding the codeword or a part of the codeword according to the form of a retransmission matrix and encoding the first parity into the form of the initial transmission matrix, and transmitting the first retransmission signal, the retransmission matrix formed of constituent elements of the initial transmission matrix but different from the initial transmission matrix and having the same capacity and diversity gain as those of the initial transmission matrix, wherein the initial transmission matrix is encoded from an initial transmission signal with the linear dispersion code is obtained by, $$S = \sum_{q=1}^{Q} (x_q C_q + x_q^* D_q)$$

(where $C_q$ and $D_q$ denote M×T complex matrices, x* denotes a conjugate complex number of a complex number x, $x_q$ denotes a symbol, and q denotes a symbol index).

9. The retransmission matrix of claim 8, wherein, when an error is reported about the first retransmission signal, a second parity is added to the first parity and a second retransmission signal is generated by both encoding the first parity to the form of the retransmission matrix and encoding the second parity to the form of the initial transmission matrix.

10. The retransmission method of claim 9, wherein generation of the third and subsequent retransmission signals due to an error detected in the second retransmission signal is performed through the same process through which the second retransmission signal is generated.

11. A retransmission method of a transmitting apparatus that performs a hybrid automatic repeat request, the retransmission method comprising:
(a) encoding a codeword that includes an information word and an initial parity to the form of an initial transmission matrix, transmitting the codeword to the receiving apparatus, and receiving a result of error checking performed on the codeword from the receiving apparatus, the initial transmission matrix corresponding to a linear dispersion code; and (b) when an error is reported about the codeword, adding a first parity to the information word and generating a first retransmission signal by both encoding the information word to the form of a retransmission matrix and encoding the first parity to the form of the initial transmission matrix, and transmitting the first retransmission signal to a receiving apparatus, wherein the retransmission matrix is formed of constituent elements of the initial transmission matrix, but is different from the initial transmission matrix and corresponds to a linear dispersion code having the same capacity and diversity gain as those of the initial transmission matrix, wherein the initial transmission matrix is encoded from an initial transmission signal with the linear dispersion code is obtained by, $$S = \sum_{q=1}^{Q} (x_q C_q + x_q^* D_q)$$

(where $C_q$ and $D_q$ denote M×T complex encoding matrices, x* denotes a conjugate complex number of a complex number x, $x_q$ denotes a symbol, and q denotes a symbol index).

12. The retransmission method of claim 11, wherein, when an error is reported on the first retransmission signal, a second parity is attached to the information word for error correction, and a second retransmission signal is generated by both encoding the information word to the form of a second retransmission matrix and encoding the second parity to the form of the initial transmission matrix, wherein, when an error is reported about the second retransmission signal, a third parity is attached to the information word, a third retransmission signal is generated by encoding the information word to the form of a third retransmission matrix and encoding the third parity to the form of the initial transmission matrix, wherein generation of fourth and subsequent retransmission signals due to an error reported about the third retransmission signal is performed through the same process through which the third retransmission signal is generated, and wherein the second retransmission matrix and the third retransmission matrix are formed of constituent elements of the initial transmission matrix but is different from the initial transmission matrix and corresponds to a linear dispersion code having the same capacity and diversity gain as those of the initial transmission matrix.

13. An error checking method of a receiving apparatus that performs a hybrid automatic repeat request, the error checking method comprising:
(a) checking errors in a retransmission signal retransmitted from a transmitting apparatus for an initial transmission signal;
(b) when an error is detected in the retransmission signal, converting a first log likelihood ratio (LLR) vector generated by LLR soft-combining of the initial transmission signal and the retransmission signal into an information word;
(c) detecting a channel variation range of the initial transmission signal and the retransmission signal and comparing the channel variation range and a predetermined reference value; and
(d) checking errors in the information word when the channel variation range exceeds the reference value, wherein the retransmission signal is formed of constituent elements of an initial transmission matrix that encodes the initial transmission signal but is different from the initial transmission matrix, and corresponds to a linear dispersion code having the same capacity and diversity gain as those of the initial transmission matrix, wherein when the channel variation range is less than the reference value in the comparison in (c), the error checking method further comprises:
(i) space-time code (STC)-combining the initial transmission signal and the retransmission signal;
(ii) performing soft-decision on elements $S_{ij}$ that form the initial transmission matrix from the STC-combining, wherein the elements $S_{ij}$ are obtained by linear combination of symbols $x_1, \ldots, x_Q$ and $x_1^*, \ldots, x_Q^*$;
(iii) calculating the soft-decisions of the symbols by performing demapping of the linear mapping which transforms the symbols into the initial transmission matrix on the matrix composed of the values obtained by the soft-decisions in ii), and generating a second LLR vector; and
(iv) converting one of the first LLR vector generated in (b) and the second LLR vector to an information word and checking errors in the information word.

14. The error checking method of claim 13, wherein, in (b), the LLR soft-combining compares the absolute values of the LLR values per bit or symbol of the initial transmission signal and the retransmission signal and chooses one LLR value having larger absolute value per bit or symbol to generate an LLR vector.

15. The error checking method of claim 13, wherein when the channel matrix during initial transmission is denoted by $H_0$, the channel matrix during the first retransmission is denoted by $H_1$, and the (i,j)-th element of matrix H is equal to the mean value of the (i,j)-th element of $H_0$ and the (i,j)-th element of $H_1$, the STC-combining is as follows:

$$[R_i \tilde{R}_i] = H[S_i \tilde{S}_i] + [n_i m_i]$$

(where the channel matrix is a matrix having a fading coefficient between the i-th receive antenna and the j-th transmit antenna as the (i, j)-th element of the matrix, $S_i$ and $\tilde{S}_i$ respectively denote the i-th column vector of the initial transmission matrix and the retransmission matrix, $\tilde{R}_i$ denotes the received signal in the form of a column vector that corresponds to $\tilde{S}_i$, $n_i$ and $m_i$ denote additive noise column vectors when measuring $R_i$ and $\tilde{R}_i$ respectively, and i denotes a natural number (where 1<i<T, and T denotes the size of space-time encoding block)).

16. The error checking method of claim 13, wherein the selected LLR vector is equal to the LLR vector having larger mean value of absolute values of LLRs and a lower standard deviation value of the absolute values of the LLRs.

17. An error checking method of a receiving apparatus that performs a hybrid automatic repeat request (ARQ), the error checking method comprising:
(a) checking errors in a first retransmission signal that has been retransmitted from a transmitting apparatus for an initial transmission signal;
(b) when an error is detected in the first retransmission signal, decoding a first LLR vector and a first parity and converting the decoding result to an information word, wherein the first LLR vector is generated by LLR soft-combining of the initial transmission signal encoded in the form of a retransmission matrix and the initial transmission signal, and the first parity is included in the first retransmission signal for error correction;

(c) detecting a channel variation range of the initial transmission signal and the first retransmission signal and comparing the channel variation range and a predetermined reference value; and (d) when the channel variation range exceeds the reference value, checking errors in the information word, wherein the first retransmission signal includes a signal and a first parity, the signal is encoded into the form of a retransmission matrix that is formed of constituent elements of the initial transmission matrix but is different from the initial transmission matrix, the retransmission matrix corresponds to a linear dispersion code having the same capacity and diversity gain as those of the initial transmission matrix, and the first parity is encoded to the initial transmission matrix for error correction and attached to the signal, wherein when the channel variation range is less than the reference value in the comparison in (c), the error checking method further comprises:

the error checking method further comprises:

(i) performing STC-combining on the initial transmission signal encoded to the form of the retransmission matrix and the initial transmission signal;

(ii) performing soft-decision on elements $S_{ij}$ that form the initial transmission matrix from the STC combining, wherein the elements $S_{ij}$ are obtained by linearly combining symbols $x_1$ to $x_Q$ and $x_1^*$ to $x_Q^*$;

(iii) calculating the soft-decisions of the symbols by performing demapping of the linear mapping which transforms the symbols into the initial transmission matrix on the matrix composed of the values obtained by the soft-decisions in ii), and generating a second LLR vector; and (iv) selecting one of the first LLR vector generated in (b) and the second LLR vector, decoding the selected one with the first parity, converting the decoding result to an information word, and checking errors in the information word.

18. The error checking method of claim 17, wherein, in (b), the LLR soft-combining compares the absolute values of the LLR values per bit or symbol of the initial transmission signal and the initial transmission signal encoded to the form of the retransmission matrix and chooses one LLR value having larger absolute value per bit or symbol to generate an LLR vector.

19. An error checking method of a receiving apparatus that performs a hybrid automatic repeat request (ARQ), the error checking method comprising:

(a) checking errors in a first retransmission signal retransmitted from a transmitting apparatus for an initial transmission signal that includes an information word and an initial parity;

(b) when an error is detected in the first retransmission signal, converting a first LLR vector to an information word, wherein the first LLR vector is generated by LLR soft-combining the information word of the first retransmission signal and the information word of the initial transmission signal;

(c) detecting a channel variation range of the initial transmission signal and the first retransmission signal and comparing the channel variation range and a predetermined reference value;

(d) when the channel variation range exceeds the reference value, decoding the information word, the initial parity, and a first parity and checking errors in the decoding result, wherein the first parity is attached to the first retransmission signal for error correction, wherein the first retransmission signal corresponds to a signal including an information word and a first parity, the information word is encoded into a first retransmission matrix formed of constituent elements of an initial transmission matrix but is different from the initial transmission matrix, the initial transmission matrix is encoded from the initial transmission signal and corresponds to a linear dispersion code having the same capacity and diversity gain as that of the initial transmission matrix, and the first parity is encoded to the initial transmission matrix and attached to the information word for error correction, wherein when the channel variation range is less than the reference value in the comparison in (c), the error checking method further comprises:

(i) STC-combining the information word encoded to the form of the first retransmission matrix and the information word encoded to the form of the initial transmission matrix;

(ii) performing soft-decision on elements $S_{ij}$ that form the initial transmission matrix from the STC-combining, wherein the elements $S_{ij}$ are obtained by linearly combining symbols $x_1$ to $x_Q$ and $x_1^*$ to $x_Q^*$;

(iii) calculating the soft-decisions of the symbols by performing demapping of the linear mapping which transforms the symbols into the initial transmission matrix on the matrix composed of the values obtained by the soft-decisions in ii), and generating a second LLR vector; and (iv) selecting one of the first LLR vector generated in (b) and the second LLR vector, decoding the selected LLR vector, the initial parity, and the first parity, and checking errors in the decoding result.

20. The error checking method of claim 19, wherein, in (b), the LLR soft combining compares the absolute values of the LLR values per bit or symbol of the information word encoded in the form of the first retransmission matrix and the information word encoded in the form of the initial transmission matrix and chooses one LLR value having larger absolute value per bit or symbol to generate an LLR vector.

21. A transmitting apparatus that performs a hybrid automatic repeat request, the transmitting apparatus comprising;

a channel encoder encoding an information word to generate a first parity for error correction and forming a codeword which is composed of the information word and the first parity; and a space-time code (STC) encoder for generating a retransmission signal by encoding the codeword to a linear dispersion code and transmitting the retransmission signal, the retransmission signal having the same capacity and diversity gain as those of an initial transmission signal, wherein the retransmission signal corresponds to a first retransmission matrix formed of constituent elements of an initial transmission matrix that encodes the initial transmission signal but different from the initial transmission matrix, wherein the initial transmission matrix is encoded from the initial transmission signal with the linear dispersion code is obtained by, $$S = \sum_{q=1}^{Q} (x_q C_q + x_q^* D_q)$$

(where $C_q$ and $D_q$ denote M×T complex matrices, x* denotes a conjugate complex number of a complex number x, $x_q$ denotes a symbol, and q denotes a symbol index).

22. The transmitting apparatus of claim 21, wherein the channel encoder generates a number of parities that correspond to a maximum number of retransmissions for generating the retransmission signals when generating the initial transmission signal.

23. The transmitting apparatus of claim 22, wherein, when an error is reported about the retransmission signal, the STC encoder adds a second parity generated by the channel encoder to the first parity, encodes the first parity to the form of the first retransmission matrix, and encodes the second parity to the form of the initial transmission matrix.

24. The transmitting apparatus of claim 22, wherein the STC encoder adds a parity generated by the channel encoder to the information word, encodes the information word to the form of the N-th retransmission matrix in accordance with the number of generations of a retransmission signal, and encodes the parity to the form of the initial transmission matrix, the N-th retransmission matrix corresponding to a linear dispersion code formed of constituent elements of the first retransmission matrix but is different from the first retransmission matrix and having the same capacity and diversity gain as those of the first retransmission matrix (where N is a natural number, equal to or greater than 1).

25. The transmitting apparatus of claim 21, wherein the STC encoder encodes an odd-numbered retransmission signal to be transmitted to the receiving apparatus to the same form as the retransmission signal and encodes an even-numbered retransmission signal to be transmitted to the receiving apparatus to the same form as the initial transmission signal.

26. The transmitting apparatus of claim 21, wherein the transmitting apparatus includes a transmitting apparatus using multiple antennas.

27. A receiving apparatus that performs a hybrid automatic repeat request, the receiving apparatus comprising:
a log likelihood ratio (LLR) calculator for generating an LLR vector by using an initial transmission signal and a retransmission signal when an error is detected in the retransmission signal;
a channel decoder for converting the LLR vector generated by the LLR calculator to an information word; and
a cycle redundancy check (CRC) unit for checking errors in the information word and transmitting a result of the error checking to a transmitting apparatus, wherein the LLR calculator performs LLR soft-combining for generating a first LLR vector formed of LLRs, each having the larger absolute value when the comparison is performed over absolute values of LLR values per bit or symbol that form repeated portions of the initial transmission signal and the retransmission signal,
wherein the LLR calculator selects one of the first LLR vector and the second LLR vector and forwards the selected one to the channel decoder, and
wherein the LLR calculator compares the mean values of the absolute values of LLRs of the first and second LLR vectors and compares the standard deviation values of the absolute values of the LLRs, and selects one LLR vector having the larger mean value of the absolute values of the LLRs and the smaller standard deviation value of the LLRs.

28. The receiving apparatus of claim 27, further comprising an STC decoder for detecting a channel variation range of the initial transmission signal and the retransmission signal and comparing the detected channel variation and a predetermined reference value.

29. The receiving apparatus of claim 27, wherein the receiving apparatus includes a receiving apparatus using multiple antennas.

* * * * *